(12) United States Patent
Shimizu et al.

(10) Patent No.: US 7,716,733 B2
(45) Date of Patent: May 11, 2010

(54) INFORMATION TERMINAL DEVICE AND CHARACTER DATA DISPLAY METHOD

(75) Inventors: Shigeki Shimizu, Aichi-ken (JP); Masakazu Harase, Aichi (JP); Tomoaki Shimofusa, Aichi (JP); Hiroaki Asai, Aichi-ken (JP)

(73) Assignee: Suncorporation, Aichi (JP)

( * ) Notice: Subject to any disclaimer, the term of this patent is extended or adjusted under 35 U.S.C. 154(b) by 838 days.

(21) Appl. No.: 11/563,058

(22) Filed: Nov. 24, 2006

(65) Prior Publication Data

US 2007/0271608 A1 Nov. 22, 2007

Related U.S. Application Data

(60) Provisional application No. 60/811,480, filed on Jun. 7, 2006.

(30) Foreign Application Priority Data

May 16, 2006 (JP) ............................. 2006-136018

(51) Int. Cl.
*G06F 7/04* (2006.01)
*G06F 12/00* (2006.01)
*G06F 12/14* (2006.01)
*G06F 13/00* (2006.01)
*G06F 17/30* (2006.01)
*G11C 7/00* (2006.01)

(52) U.S. Cl. ........................................... 726/17; 726/4
(58) Field of Classification Search ................... 726/17, 726/4
See application file for complete search history.

(56) References Cited

U.S. PATENT DOCUMENTS 5,696,826 A * 12/1997 Gao ............................. 380/28
5,922,073 A * 7/1999 Shimada ........................ 726/6

2004/0006517 A1 1/2004 Takatori
2005/0043016 A1 2/2005 Nakatsuka

FOREIGN PATENT DOCUMENTS

JP 2003-003235 1/2003

(Continued)

OTHER PUBLICATIONS

Ferraiolo; A role-based access control model; Feb. 1999; TISSEC; vol. 2; Issue 1.*
Zdancewic; Secure program partitioning; Aug. 2002; TOCS; vol. 20; Issue 3.*

*Primary Examiner*—Kambiz Zand
*Assistant Examiner*—Stephen Sanders
(74) *Attorney, Agent, or Firm*—LRK Patent Law Firm

(57) ABSTRACT

The information terminal device of the invention has a first function of displaying non-confidential data in a selectable manner on its display screen and, in response to the user's selection of the non-confidential data, showing the details of the non-confidential data. The information terminal device also has a second function of displaying confidential data in a selectable manner and, in response to the user's selection of the confidential data, showing the details of the confidential data. The first function is given as one normally selectable menu option and is activated by the user's selection of the corresponding menu. The second function is, however, not given as a normally selectable menu option and is triggered only by the user's series of operations of an operation unit in a preset sequence. No operation-related display appears on the display screen of the information terminal device during the user's series of operations of the operation unit. The information terminal device of this configuration does not hint even the presence of confidential data to any third person and thus effectively prevents the third person from analyzing or decoding the data stored in the information terminal device and having illegal access to the confidential data. This arrangement of the invention desirably enables the safe handling of confidential data without the potential for leakage of the confidential data from the information terminal device.

13 Claims, 24 Drawing Sheets

FOREIGN PATENT DOCUMENTS

| | | |
|---|---|---|
| JP | 2003162483 A | 6/2003 |
| JP | 2003-209544 | 7/2003 |
| JP | 2003216550 A | 7/2003 |
| JP | 2003296568 A | 10/2003 |
| JP | 2004-159243 | 6/2004 |
| JP | 2004-328552 | 11/2004 |
| JP | 2006048270 A | 2/2006 |

* cited by examiner

INFORMATION TERMINAL DEVICE AND CHARACTER DATA DISPLAY METHOD

CROSS-REFERENCE TO RELATED APPLICATION

This application claims the benefit of U.S. Provisional Application No. 60/811,480, filed Jun. 7, 2006.

BACKGROUND OF THE INVENTION

1. Field of the Invention

The present invention relates to an information terminal device that is capable of transmitting data to and from a server device on a communication line. More specifically the invention pertains to the technique of preventing intentional or unintentional leakage of confidential data from the information terminal device.

2. Background Art

The advancement of the communication technology and the computer-related technology has significantly enhanced the performances of diverse information terminal devices including cell phones, PDAs (personal digital assistances), and laptops. These information terminal devices have the comparable throughput to those of some old versions of desktop computers. With the improved performances, various functions including a mail function, a browser function, a word processing function, and a spreadsheet function are installed in such information terminal devices. These information terminal devices are mobile and portable and are thus usable at any time and at any location, for example, during a business trip or during a travel.

The information terminal device is mobile and portable and is thus not free from the possibility of being lost or stolen to be transferred to the third person. There is accordingly a fear that confidential data stored in the information terminal device is leaked to the outside. In order to enable the information terminal device to safely deal with emails of confidentiality and other confidential data including important document data, one proposed technique sets a password to the confidential emails and the confidential data and requires entry of the valid password to open the confidential emails and the confidential data (see Japanese Patent Laid-Open Gazette No. 2003-209544).

The proposed technique requires entry of the valid password to open the confidential data. The display of a folder for storage of the confidential data and a password entry window, however, undesirably informs the third person of the presence of the confidential data. There is accordingly a fear that the third person breaks the password and leaks the contents of the confidential data to the outside.

The object of the invention is thus to eliminate the drawbacks of the prior art technique and to provide a technique of concealing even the presence of confidential data to any third person and thus enabling an information terminal device to safely and securely deal with the confidential data.

DISCLOSURE OF THE INVENTION

In order to attain at least part of the above and the other related objects, the present invention is directed to an information terminal device that reads character data including at least a character string from a server device on a communication line and displays the character data on a display screen.

The information terminal device includes: an option menu display module that displays on the display screen an option menu, which includes multiple options corresponding to multiple functions installed in the information terminal device in a selectable manner; a general data display module that is activated by selection of a corresponding option in the option menu to enable a first function, which displays non-confidential character data as general data on the display screen in a selectable manner and, in response to selection of one of the displayed general data, displays content of the selected general data; an operation unit that is operated to select one of the multiple options included in the option menu to activate a corresponding one of the multiple functions; an operation detection module that detects operation of the operation unit; and a confidential data display module that is not included as one option in the option menu but is activated by a specific series of operations of the operation unit in a preset order to enable a second function, which displays confidential character data as confidential data on the display screen in a selectable manner and, in response to selection of one of the displayed confidential data, displays content of the selected confidential data.

The operation detection module detects the specific series of operations of the operation unit in the preset order without displaying an operation-related window on the display screen.

In the information terminal device of the invention, among the multiple functions corresponding to the multiple options included in the option menu in the selectable manner, the first function is selectively enabled to display the general data on the display screen in the selectable manner. In response to selection of one of the displayed general data, the content of the selected general data is displayed on the display screen. The information terminal device has the operation unit that is manipulated to enable any of the multiple functions installed therein. Such selection and activation is validated by detection of the operations of the operation unit. The second function installed in the information terminal device is selectively enabled to display the confidential data on the display screen in the selectable manner. In response to selection of one of the displayed confidential data, the content of the selected confidential data is displayed on the display screen. The second function, however, does not correspond to any of the multiple options included in the option menu and is enabled only by detection of the specific series of operations of the operation unit in the preset order. The operation-related window is not opened on the display screen during the specific series of operations of the operation unit in the preset order.

In the information terminal device of the invention, the first function relating to the general data is activatable by selection of the corresponding option in the option menu. The second function relating to the confidential data is, however, not activatable by selection of an option in the option menu but is activated by only the specific series of operations of the operation unit in the preset order. The operation-related window is not displayed during the specific series of operations. This arrangement significantly lowers the possibility that any third person notices the presence of the confidential data. Analyses of the programs installed in and the data structures stored in the information terminal device require the extreme labor and time. When the presence of the confidential data is not noticeable, there is little possibility of internal analysis and leakage of confidential data. The information terminal device of the invention thus ensures safe and secure processing of confidential data without the fear of leakage of the confidential data.

One typical example of the operation unit includes multiple option buttons. The operation unit is, however, not restricted to this structure but may have any structure that is operable to enable each of the multiple functions installed in the information terminal device. For example, the operation unit may be operated by voice recognition technology or image recognition technology. The operation buttons may be physically operable buttons or may be virtual buttons displayed on the display screen. When authentication or verification of, for example, the voice pattern, the face pattern, or the fingerprint is required to activate some or all of the multiple functions, a detector of the voice pattern, the face pattern, or the fingerprint is part of the operation unit.

The character data read from the server device may be stored in the information terminal device before or after the display on the display screen. The character data may otherwise be not stored in the information terminal device but may be read from the server device on each occasion of requirement, like the conventional Web mails and bulletin board.

In one preferable embodiment of the information terminal device, the option menu includes a selectable option corresponding to a third function. The second function is enabled only by the specific series of operations of the operation unit in the preset order during execution of the third function, to display the confidential data in the selectable manner.

It is imaginable that the third person trying to find the confidential data activates the first function relating to display of the general character data. There is, however, little possibility that the third person activates the third function different from the first function. In this preferable embodiment, the second function is activatable only by the specific series of operations of the operation unit in the preset order during execution of the third function. This arrangement effectively prevents the third person from noticing the second function and thereby even the presence of the confidential data.

A preferable example of the third function is not directly related to display of character data but is conventionally installed in the information terminal device (for example, scheduling function or game function). The third person trying to find the confidential data does not give attention to the functions irrelevant to the display of character data or the conventional functions included in the option menu. Setting the third function in this manner preferably prevents the third person from accidentally or intentionally activating the second function and noticing the presence of the confidential data.

The present invention is also directed to a character data display method that reads character data including at least a character string from a server device on a communication line and displays the character data.

The character data display method includes the steps of: (A) displaying an option menu, which includes multiple options corresponding to multiple functions in a selectable manner; (B) detecting an operation of an operation unit that is provided for selecting one of the multiple options included in the option menu to activate a corresponding one of the multiple functions; (C) enabling a first function that is activated by selection of a corresponding option in the option menu to display non-confidential character data as general data in a selectable manner and, in response to selection of one of the displayed general data, to display content of the selected general data; (D) enabling a second function that is not included as one option in the option menu but is activated by a specific series of operations of the operation unit in a preset order to display confidential character data as confidential data in a selectable manner and, in response to selection of one of the displayed confidential data, to display content of the selected confidential data.

The step (B) detects the specific series of operations of the operation unit in the preset order without displaying an operation-related window.

Like the information terminal device described above, the character data display method of the present invention allows activation of the second function only by detection of the specific series of operations of the operation unit in the preset order to display the confidential data on the display screen in the selectable manner. Otherwise no confidential data is displayed on the display screen. The operation-related window is not displayed during the specific series of operations. This arrangement desirably prevents any third person from noticing even the presence of the confidential data and ensures safe and secure processing of the confidential data without the fear of leakage of the confidential data.

In one preferable embodiment of the character data display method, the option menu includes a selectable option corresponding to a third function. The second function is enabled only by the specific series of operations of the operation unit in the preset order during execution of the third function, to display the confidential data in the selectable manner. A preferable example of the third function is not directly related to display of character data but is conventionally installed in the information terminal device (for example, scheduling function or game function).

There is little possibility that the third person trying to find the confidential data activates the irrelevant third function. This arrangement effectively prevents the third person from noticing even the presence of the confidential data.

In another preferable embodiment of the character data display method, the confidential data is displayed on the display screen in a selectable manner in response to entry of a predetermined password through operation of multiple operation buttons set on the operation unit for entry of characters. Entry of the predetermined password is detected without display of a password entry window on the display screen.

The display of the password entry window for entry of the password may cause the third person to realize the presence of the concealed function. The third person may then analyze the internal program and the data structure to find out the content of the confidential data. No display of the password entry window desirably avoids this potential.

In the character data display method of the invention, an auxiliary function for dealing with the confidential data may be added to the second function. One preferable example of the auxiliary function embeds the content of the confidential data in specific data to prepare faked confidential data as fake specific data. Since the confidential data is character data, the specific data is preferably conventional data other than the character data, for example, image data, sound data, or voice data. The 'fake specific data' is usable in the same manner as the original specific data, so that inclusion of different data in the fake specific data is unnoticeable. For example, fake image data is read by a conventional application program to display a corresponding image in the same manner as original image data. Data embedded in the fake image data is extractable by a predetermined operation. The auxiliary function may additionally store the fake specific data or the faked confidential data.

The confidential data is stored in the form of the fake specific data by means of the auxiliary function. The fake specific data appears as the conventional data, such as image data, sound data, or voice data. Even if the third person has found the fake specific data, this arrangement effectively prevents analysis of the fake specific data and leakage of the content of the confidential data.

In the character data display method of this example, the auxiliary function may additionally send the fake specific data or the faked confidential data to the server device. The second function combined with this auxiliary function embeds the content of the confidential data in specific data to prepare faked confidential data as fake specific data and sends the faked confidential data to the server device via the communication line.

In the character data display method of the invention, another preferable example of the auxiliary function receives from the server device faked confidential data, which includes the content of the confidential data embedded in specific data, and extracts the embedded content of the confidential data from the received faked confidential data.

In the character data display method of this example, the confidential data is transmittable in the form of the fake specific data from and to the server device. Even when the third person accidentally or intentionally glances at the fake specific data in the course of transmission, this arrangement effectively prevents leakage of the content of the embedded confidential data.

In the character data display method of the invention, still another preferable example of the auxiliary function immediately hides the displayed confidential data or the displayed content of the selected confidential data, in response to detection of a preset operation of the operation unit during display of the confidential data or the content of the selected confidential data.

When there is a fear that the third person accidentally or intentionally glances at the displayed confidential data or the displayed content of the selected confidential data, the auxiliary function of this example immediately hides the display in response to the preset operation of the operation unit. This arrangement desirably prevents the third person from noticing the presence of the confidential data. One typical procedure of hiding the display simply closes the displayed window. Another applicable procedure of hiding the display changes the display to a specific display set in advance. Adequate selection of the specific display makes the change of the display unnoticeable and thus effectively prevents the third person from noticing the presence of the confidential data.

In the character data display method of the invention, another preferable example of the auxiliary function stores the confidential data read from the server device, counts the number of times of displaying the content of each of the confidential data on the display screen, and deletes specific confidential data, which has been displayed a predetermined allowable number of times, from the storage of the confidential data.

The auxiliary function of this example sets an adequate value to the allowable number of times of displaying each of the confidential data and accordingly avoids the everlasting storage of the confidential data. This arrangement effectively prevents leakage of the content of the confidential data.

In the character data display method of the invention, still another preferable example of the auxiliary function stores the confidential data read from the server device, makes access to the server device under a predetermined condition to identify requirement or non-requirement for deletion of each of the stored confidential data, and upon identification of the requirement for deletion of specific confidential data, deletes the specific confidential data from the storage of the confidential data. The predetermined condition for making access to the server device may be any of various conditions, for example, at the time of power supply to a device used for display of character data. An access to the server device may otherwise be gained prior to start of operations for display of the character data.

The auxiliary function of this example sets the requirement or non-requirement for deletion of the confidential data in the server device. This arrangement ensures deletion of the stored confidential data and thus effectively prevents leakage of the content of the confidential data.

The character data display method of the invention is actualized by a computer that reads and executes a predetermined program to exert the required functions. Namely another possible application of the invention is a program that corresponds to the character data display method described above and is executed by the computer to attain the various functions.

The present invention is accordingly directed to a program that causes a computer to actualize a character data display method of reading character data including at least a character string from a server device on a communication line and displaying the character data.

The program causes the computer to attain the functions of: (A) displaying an option menu, which includes multiple options corresponding to multiple functions in a selectable manner; (B) detecting an operation of an operation unit that is provided for selecting one of the multiple options included in the option menu to activate a corresponding one of the multiple functions; (C) enabling a first function that is activated by selection of a corresponding option in the option menu to display non-confidential character data as general data in a selectable manner and, in response to selection of one of the displayed general data, to display content of the selected general data; (D) enabling a second function that is not included as one option in the option menu but is activated by a specific series of operations of the operation unit in a preset order to display confidential character data as confidential data in a selectable manner and, in response to selection of one of the displayed confidential data, to display content of the selected confidential data.

The function (B) detects the specific series of operations of the operation unit in the preset order without displaying an operation-related window.

In the program of the invention, the function (A) may display the option menu including a selectable option corresponding to a third function on the display screen. The function (D) may enable the second function relating to the confidential data, in response to the specific series of operations of the operation unit in the preset order during execution of the third function activated by selection of the corresponding option in the displayed option menu.

The computer reads this program to exert the various functions described above. This arrangement effectively prevents leakage of the confidential data and enables the information terminal device to safely and securely deal with the confidential data.

BEST MODES OF CARRYING OUT THE INVENTION

Figure 1:
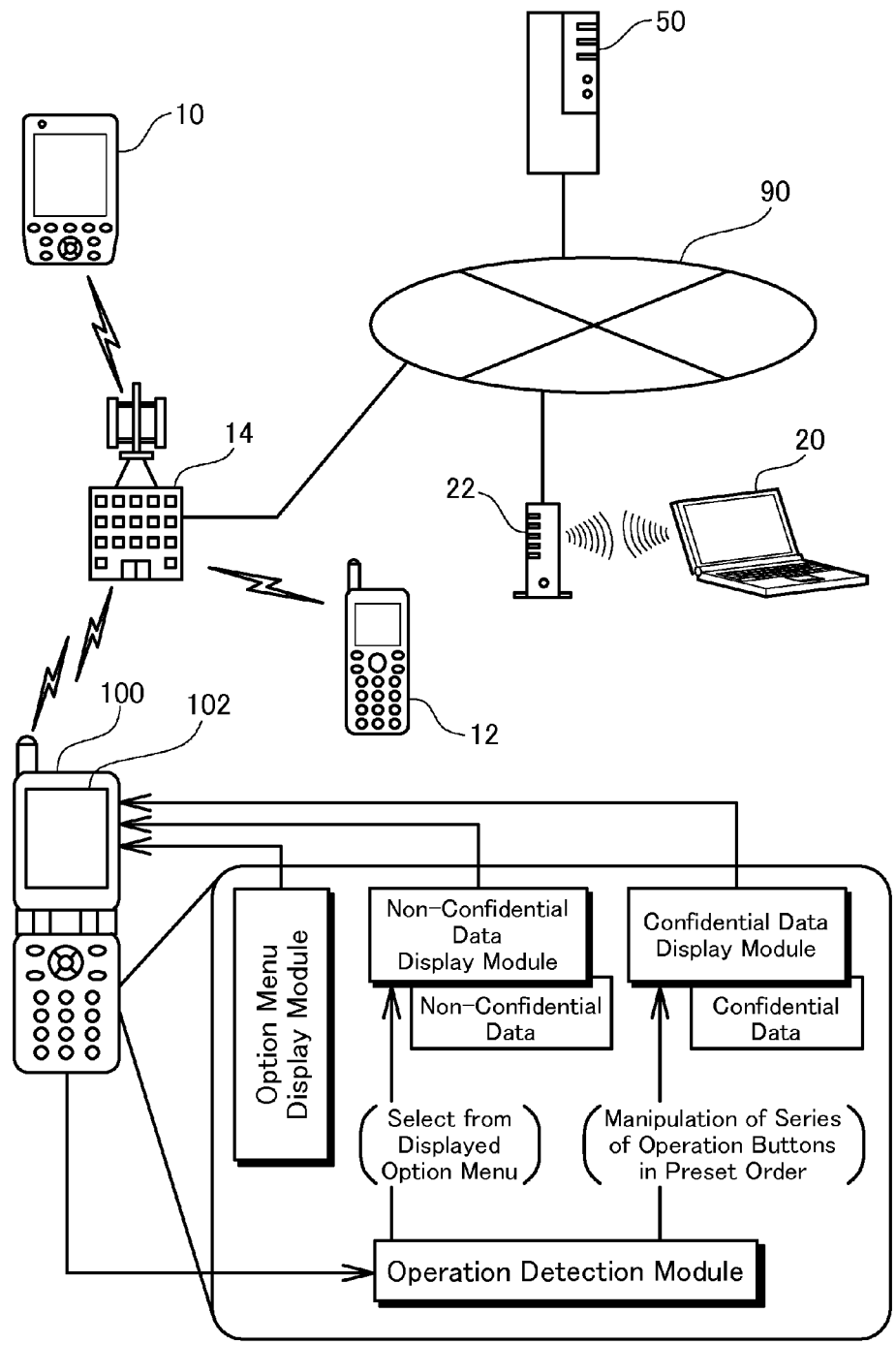
FIG. 1 schematically illustrates the configuration of a character data display system including an information terminal device in one embodiment of the invention.

In order to clarify the functions, the advantages, the features, and the effects of the invention, some modes of carrying out the invention are described below in the following sequence with reference to the accompanied drawings:

A. General Outline of Embodiment
B. Structure of Information Terminal Device
C. Outline of Option Menu
D. General Email-Related Operations
E. Confidential Email-Related Operations
   E-1. Process of Receiving Confidential Email
   E-2. Process of Creating and Sending Confidential Email
      E-2-1. Sending to General Email Address
      E-2-2. Sending to Secret Address
   E-3. Process of Externally Storing Confidential Email
   E-4. Process of Transferring Confidential Data
F. Modifications
   F-1. First Modified Example
   F-2. Second Modified Example
   F-3. Third Modified Example
   F-4. Fourth modified Example
   F-5. Fifth Modified Example
   F-6. Sixth Modified Example A. General Outline of Embodiment For the better understanding, the general outline of an embodiment of the invention is described briefly, before its detailed explanation. FIG. 1 schematically illustrates the configuration of a character data display system including an information terminal device in one embodiment of the invention. As illustrated, the character data display system of the embodiment includes a server device 50 that is connected to a communication line, for example, the Internet 90, and diversity of information terminal devices that are connectable with the Internet 90. The information terminal devices may be any devices that are accessible to the Internet 90 to read data stored in the server device 50 and may include, for example, a cell phone 12, a PDA (Personal Digital Assistance) 10, and a laptop 20. Each of the information terminal devices is connectable to the Internet 90 via a wireless base station 14 or a wireless router 22 to read data stored in the server device 50 and, when the read data includes a character string (character data), to display the contents of the read data on a display screen of the information terminal device. In a typical procedure, multiple character data are displayed on the display screen of the information terminal device to allow the user's selection, and the details of the user's selected character data are displayed on the display screen.

With the recent advancement of the computer-related technologies, the information terminal device has the improved performance and has various functions including an email function, a browser function, a word processing function, and a spreadsheet function. The information terminal device is thus often required to deal with confidential data (data secret to any third person). The information terminal device may be lost or stolen and be transferred to a third person. Even when the confidential data is protected with a password or is encoded, the third person may break the password or the code to have illegal access to the confidential data.

By taking into account such fears, an information terminal device 100 of the embodiment has an 'option menu display module', a 'character data display module', and an 'operation detection module'. Here the terminology 'modules' represent classified functions of convenience executed in the information terminal device 100. Each 'module' may be attained by part of a program, may be actualized by a logic circuit having specific functions, or may be a combination of such software and hardware configurations.

The 'option menu display module' displays an option menu on a display screen 102 of the information terminal device 100. The option menu shows multiple functions installed in the information terminal device 100 in a selectable manner. When the user manipulates any of diverse operation buttons set on the information terminal device 100, the 'operation detection module' detects the user's manipulation of the operation buttons and identifies a function selected by the user from the option menu. When a first function is selected from the option menu, a 'non-confidential data display module' is activated to display non-confidential data in a selectable manner on the display screen 102 and, in response to the user's selection of desired one of the displayed non-confidential data, to display the details of the selected non-confidential data on the display screen 102. The non-confidential data have been read from the server device 50 via the Internet 90 and have been stored in the information terminal device 100 to be accessible by the 'non-confidential data display module'. In the structure of the embodiment, the operation buttons set on the information terminal device 100 are manipulated for various operations of the first functions, for example, selection of desired one of the non-confidential data displayed on the display screen 102.

The information terminal device 100 of the embodiment also has a 'confidential data display module'. Activation of the 'confidential data display module' validates a second function. The second function displays confidential data in a selectable manner on the display screen 102 and, in response to the user's selection of desired one of the displayed confidential data, displays the details of the selected confidential data on the display screen 102. The confidential data have been read from the server device 50 via the Internet 90 and have been stored in the information terminal device 100 to be accessible only by a 'confidential data display module'.

In the information terminal device 100 of the embodiment, the second function is not included in the displayed option menu. The 'confidential data display module' is thus not activatable by selection of the second function in the option menu. When the user manipulates a series of operation buttons in a preset order, the 'operation detection module' detects the user's manipulation of the operation buttons to allow activation of the 'confidential data display module'. A window relating to the manipulation of the operation buttons is not displayed on the display screen 102 during the user's manipulation of the series of operation buttons in the preset order.

The second function of dealing with the confidential data is not displayed as one option of the option menu in the information terminal device 100 of the embodiment. Activation of the first function selected from the option menu allows display of only the non-confidential data. Manipulation of the series of operation buttons in the preset order, for example, to enter a password, is required for activation of the second function. The window relating to the manipulation of the operation buttons is not displayed on the display screen 102 during the user's manipulation of the series of operation buttons in the preset order. Even if the information terminal device 100 is lost or stolen and transferred to any third person, the third person does not notice even the presence of the second function or the confidential data. The third person accordingly does not try to analyze or decode the internal data of the information terminal device 100. This arrangement effectively prevents accidental leakage of the confidential data.

In the illustration of FIG. 1, the non-confidential data and the confidential data are stored in separate storage areas. Such separate storage is, however, not required. The non-confidential data and the confidential data may be stored in an identical storage area as long as they are distinguishable from each other. For example, attribute data representing an attribute of either the non-confidential data or the confidential data may be set in a header of character data for the purpose of identification. Such setting of the attribute data enables mixed storage of the non-confidential data and the confidential data in one identical storage area.

In the above description, the non-confidential data and the confidential data read from the server device 50 via the Internet 90 have been stored in the information terminal device 100. Storage of the non-confidential data and the confidential data in the information terminal device 100 is, however, not essential. In one possible modification, the non-confidential data and the confidential data may be read from the server device 50 according to the requirements and displayed on the display screen 102. Typical examples of such data include Web mails and bulletin board. In the information terminal device 100 additionally having a voice recognition module or an image recognition module, the non-confidential data or the confidential data may be displayed on the display screen 102 in response to detection of an operation related to the additional module, in addition to or in place of the manipulation of the operation buttons. The embodiment of the invention is described in detail with a cell phone used as the information terminal device 100.

B. Structure of Information Terminal Device

Figure 2:
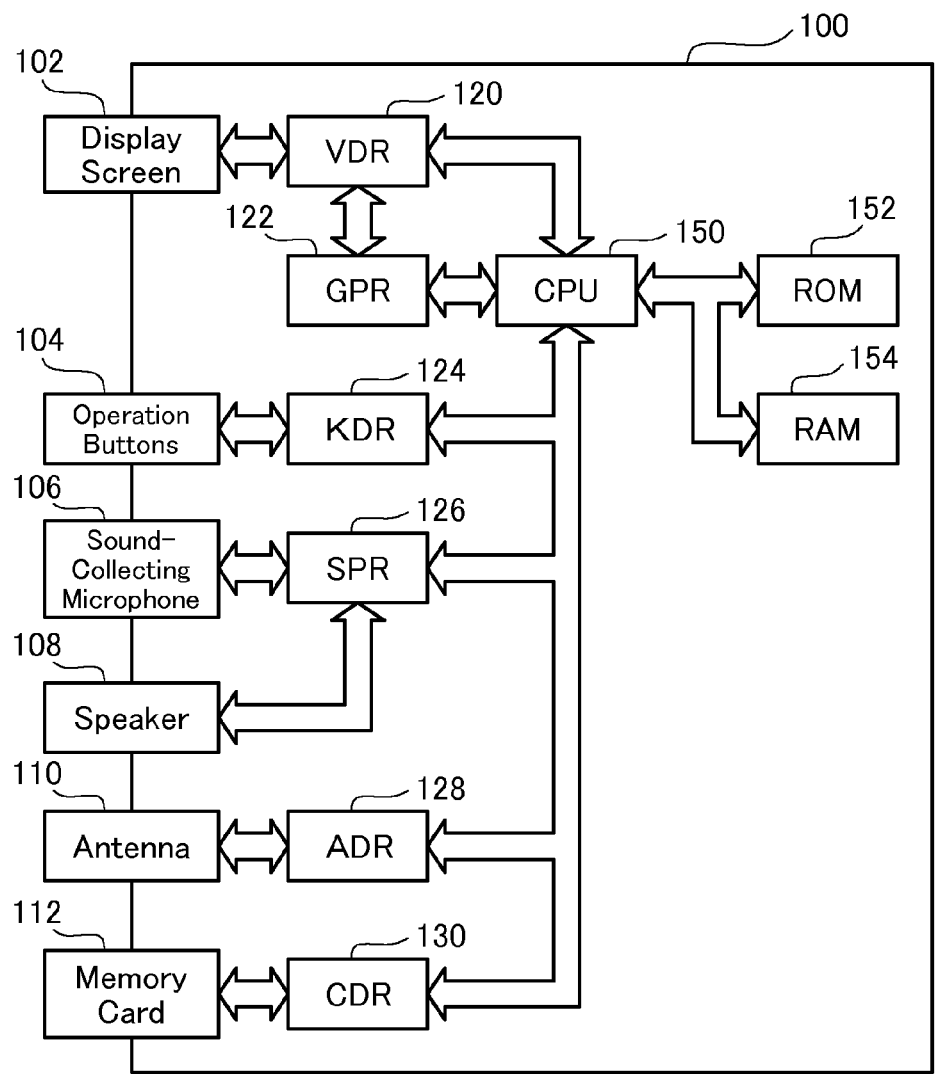
FIG. 2 is a block diagram showing the structure of a cell phone as the information terminal device of the embodiment.

FIG. 2 is a block diagram showing the structure of a cell phone as the information terminal device 100 of the embodiment. The information terminal device 100 has diversity of elements required for its general use. The elements include the display screen 102 as a liquid crystal display, diverse operation buttons 104 manipulated for various operations, for example, to make a phone call, a sound-collecting microphone 106 used for phone calls, a speaker 108 used for phone calls and reproduction of voice data, an antenna 110 for communication with the wireless base station 14 (or with the wireless router 22), and a detachable memory card 112.

The information terminal device 100 includes driving circuits for driving and actuating these elements. For example, the display screen 102 is driven by a video driver 120, the operation buttons 104 are actuated by a button key driver 124, and the sound-collecting microphone 106 and the speaker 108 are driven by a sound processor 126. The antenna 110 and the memory card 112 are respectively actuated by an antenna driver 128 and a card driver 130. In the information terminal device 100 of the embodiment, these drivers are made of exclusive LSI chips and are connected with a CPU 150 to receive and send data from and to the CPU 150. The CPU 150 performs arithmetic and logic operations and is connected with a ROM 152 as a non-volatile memory that allows only data reading but prohibits data writing and with a RAM 154 as a non-volatile memory that allows both data reading and data writing. Various control programs are stored in these non-volatile memories. The CPU 150 reads a control program from the ROM 152 or the RAM 154, stores data produced during execution of the control program into the RAM 154, and controls the operations of the diverse elements, so as to control the operations of the whole information terminal device 100.

Figure 3:
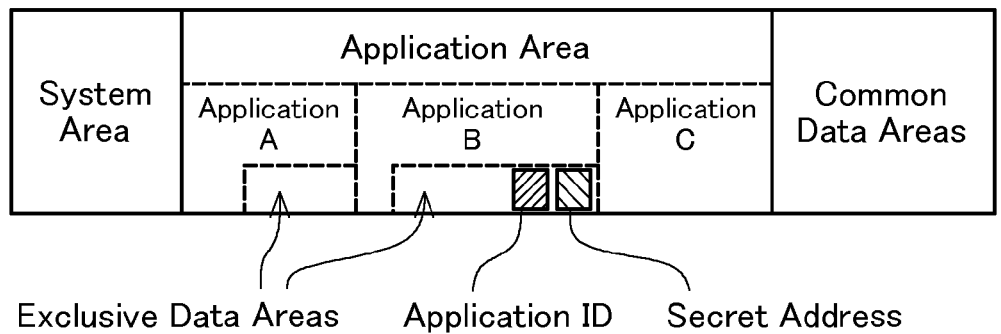
FIG. 3 conceptually shows the use status of a memory area accessible by a CPU included in the information terminal device.

FIG. 3 conceptually shows the use status of a memory area accessible by the CPU 150. As is known in the art, the ROM 152 and the RAM 154 have data storage in the units of bytes. Sequential numbers called 'addresses' are allocated to individual bytes of stored data. The CPU 150 specifies address numbers to freely read desired data from the ROM 152 and the RAM 154, while specifying address numbers set in the RAM 154 to write data into the RAM 154. The areas of the ROM 152 and the RAM 154 with allocation of address numbers are called a 'memory area'. The memory area is mainly divided into three divisions, 'system area', 'application area', and 'common data area'.

The 'system area' stores a basic program or the operating system (OS). The operating system (OS) controls the operations of the driving circuits for the diverse elements installed in the information terminal device 100 (for example, the video driver 120, the button key driver 124, and the card driver 130).

The 'application area' stores various application programs to attain the various functions of the information terminal device 100 (for example, the mail function, the browser function, the word processing function, and the spreadsheet function). In the illustrated example of FIG. 3, three application programs, application A, application B, and application C are stored in this application area. The application area has a preset number of bytes for storage allocated in advance. When the application area has marginal bytes for further storage, an additional application program may be newly stored to add a new function to the information terminal device 100. The number of bytes allocated to the application area (the memory capacity of the application area) is fixed. Storage of an extremely large application program (occupying a large number of bytes) interferes with storage of other application programs. In order to allow storage of a number of application programs, an upper limit is generally set to the memory capacity allowed for storage of each application program.

The 'common data area' stores data commonly used by the various application programs. The common data area is accessible by the operating system and the various application programs. Data created by one application program and stored in the common data area is usable by another application program.

Each application program stored in the application area may set an exclusive data area within the memory capacity allowed for the application program. Only the corresponding application program is allowed to read and write data from and into the exclusive data area. Storage of data in an exclusive data area of a certain application program prohibits other application programs and the operating system from being informed of the presence of such data, let alone from reading and writing the data from and into the exclusive data area. In the case of requirement for storage of a product number and a serial number of each application program, these data are stored in the exclusive data area of the application program. In the illustrated example of FIG. 3, data 'application ID' and 'secret address' are stored in an exclusive data area of the application B. The details of the application ID and the secret address will be described later.

Figure 4:
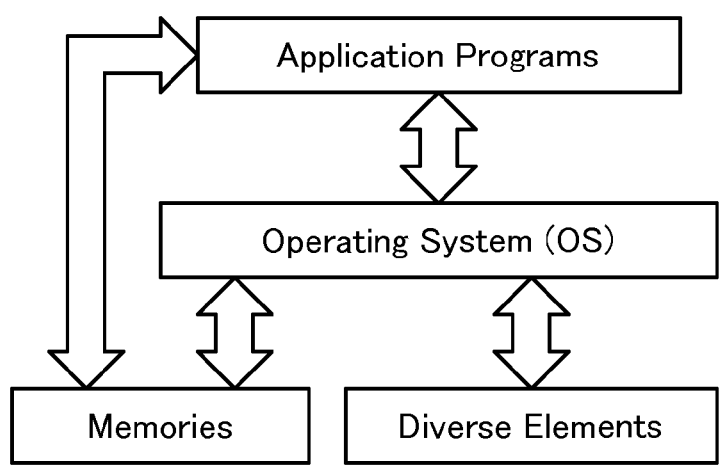
FIG. 4 conceptually shows the relation between application programs and an operating system installed in the information terminal device.

FIG. 4 conceptually shows the relation between the application programs and the operating system installed in the information terminal device 100. As mentioned above, the operating system functions to drive the diverse elements included in the information terminal device 100, and the application programs drive the diverse elements via the operating system in principle. For example, when one application program is activated to display a graphic on the display screen 102, the operating system receives a request from the application program and controls the video driver 120 to actuate the display screen 102 for display of the graphic. This arrangement does not require the individual application programs to directly drive and actuate the relevant elements, for example, the display screen 102 and thus desirably simplifies the structures of the application programs. This arrangement also enables the effective use of the diverse elements, irrespective of the difference in detailed specifications ascribed to the different models. The memories, that is, the ROM 152 and the RAM 154, are accessible directly by each of the application programs, as well as indirectly via the operating system.

C. Outline of Option Menu

The information terminal drive 100 of the embodiment constructed as described above has the various additional functions including the mail function and the browser function, in additional to the general phone call functions of the cell phone. Each of these additional functions is activated by selection of a relevant menu in the option menu.

Figure 5:
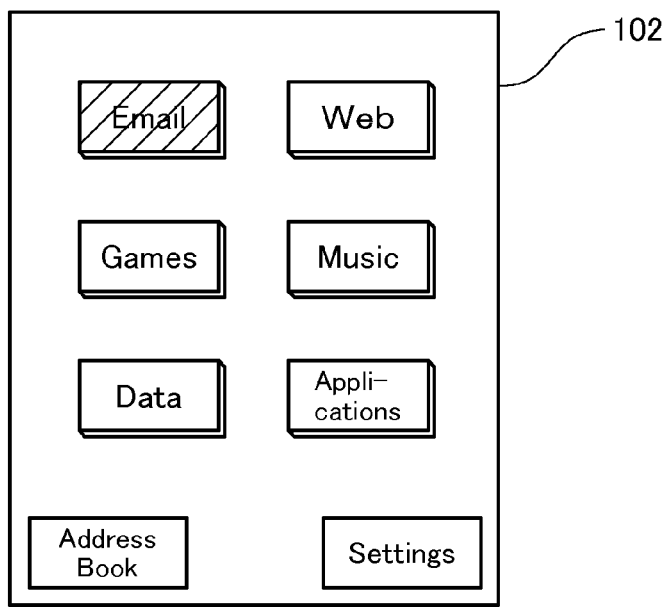
FIG. 5 shows one example of an option menu opened on a display screen on power supply to the information terminal device of the embodiment.

FIG. 5 shows one example of the option menu displayed for selective activation of the various functions installed in the information terminal device 100 of the embodiment. On power supply of the information terminal device 100 of the embodiment, the operating system is activated to open the option menu shown in FIG. 5 on the display screen 102. The option menu of FIG. 5 includes six buttons for six options 'Email', 'Web', 'Games', 'Music', 'Data', and 'Applications'. In response to the user's selection of the option button 'Email', the general email function is activated to receive and display non-confidential emails (general emails) on the display screen 102 and to prepare and send general emails. In response to the user's selection of the option button 'Web', the browser function is activated to browse Web pages set on the Internet 90. In response to the user's selection of the option button 'Games', a game application program installed in the information terminal device 100 is activated for the games. In response to the user's selection of the option button 'Music', music data stored in the information terminal device 100 is reproduced. In response to the user's selection of the option button 'Data', the user can refer to or edit text data or spreadsheet data stored in the information terminal device 100 or newly create such data. Other diverse functions, for example, a schedule management function, are allocated to the option button 'Applications'. In response to the user's selection of the option button 'Applications', a submenu is opened to display available functions in a selectable manner. In the information terminal device 100 of the embodiment, the user manipulates the operation buttons 104 to perform all the operations including selection of the option buttons displayed on the display screen 102.

Figure 6:
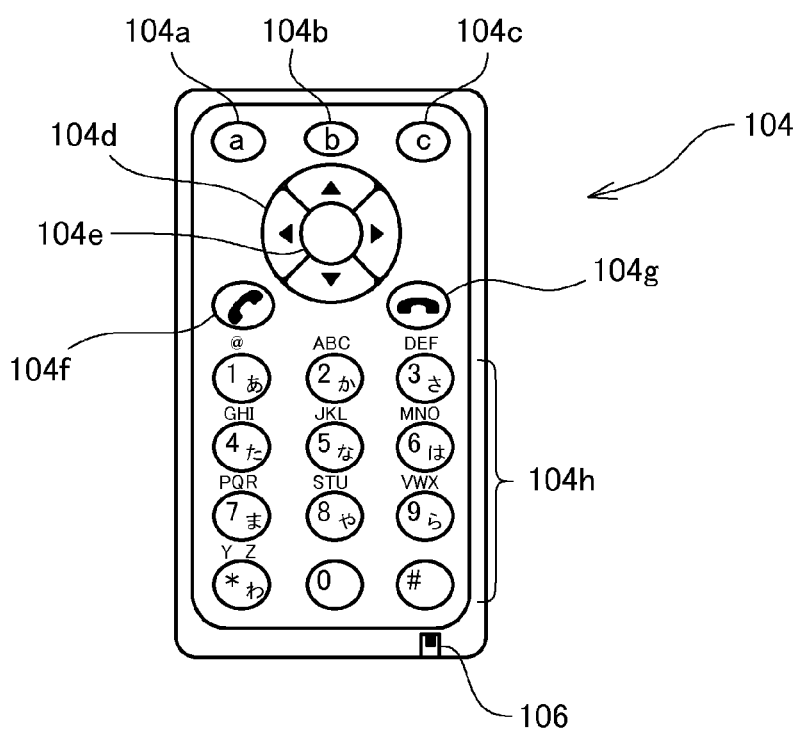
FIG. 6 shows various operation buttons set on the information terminal device of the embodiment.

FIG. 6 shows the various operation buttons 104 set on the information terminal device 100 of the embodiment. As illustrated, cursor buttons 104d are placed on the upper center of the main body of the information terminal device 100. A select button 104e is provided on the center of the cursor buttons 104d. The user operates the cursor buttons 104d to scroll the cursor on the display screen 102 upward, downward, leftward, and rightward, while operating the select button 104e to selectively activate a function at the cursor position. In the illustrated example of FIG. 5, the cursor is placed on the option button 'Email'. The user operates the cursor buttons 104 to move the cursor to any desired position and presses the select button 104e at the desired cursor position to select a function at the cursor position.

Three function select buttons 104a, 104b, and 104c are provided above the cursor buttons 104d. These function select buttons 104a, 104b, and 104c are active while the corresponding functions are displayed on the bottom of the display screen 102. A press of the function select button 104a, 104b, or 104c corresponding to a selected function enables the selected function. In the illustrated example of FIG. 5, two functions 'Address Book' and 'Settings' are displayed on the bottom of the display screen 102. The function 'Address Book' is assigned to the left function select button 104a, and the function 'Settings' is assigned to the right function select button 104c. The user's click of the left function select button 104a in this state selects the function 'Address Book' to display relevant pieces of information, such as telephone numbers and email addresses, which are stored in the information terminal device 100, on the display screen 102 and to enable the user's selection among the telephone numbers and the email addresses displayed on the display screen 102. The user's click of the right function select button 104c selects the function 'Settings' to enable the user's settings for the information terminal device 100. In the option menu of FIG. 5, no function is displayed on the bottom center of the display screen 102. The center function select button 104b is thus inactive and a press of this center function select button 104b does not enable any additional function.

A call start button 104 and a hang-up button 104g with graphics of a telephone receiver are provided on the lower left side and the lower right side of the cursor buttons 104d. In the case of an incoming call, a press of the call start button 104f enables the user to receive the call and start talking over the phone, and a press of the hang-up button 104g enables the user to hang up the call. In the case of an outgoing call, the user operates entry buttons '1 to '0' 104h to enter a desired telephone number and presses the call start button 104f above the entry buttons 104h to make a phone call. During a call, the sound-collecting microphone 106 placed below the entry buttons 104h is active to collect the talking voice of the user as voice data, convert the voice data to electric signals, and send the electric signals on radio wave. The talking voice on the other end of the line is reproduced as voice from the speaker 108 (not shown) placed above the display screen 102.

D. General Email-Related Operations

In the information terminal device 100 of the embodiment, the general email function is activated by the user's selection of the option button 'Mail' in the option menu of FIG. 5 opened on the display screen 102. The user operates the cursor buttons 104d to position the cursor at the option button 'Mail' and presses the select button 104 at the cursor position. The operating system detects the user's button operations and reads and executes the application program stored in the corresponding application area to enable a series of processing involved in the general email function. The application program read and executed to enable the general email function is the application A stored in the application area as shown in FIG. 3. In the information terminal device 100 of the embodiment, the series of processing involved in the general email function is executed by the application program stored in the application area. Since the general email function is one of the standard functions, the relevant application program may be stored in the system area.

Figure 7:
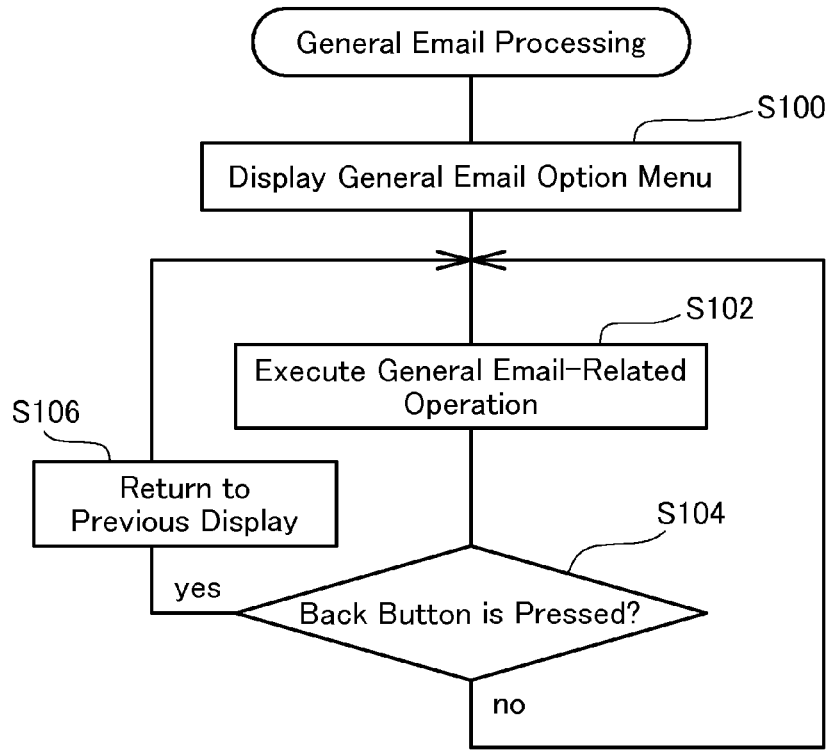
FIG. 7 is a flowchart showing a series of general email processing executed in response to a call of a general email function by the operating system.

FIG. 7 is a flowchart showing a series of general email processing executed in response to a call of the general email function by the operating system. The general email processing flow first opens an option menu to allow selection among various functions relating to the general email (general email option menu) on the display screen 102 (step S100).

Figure 8:
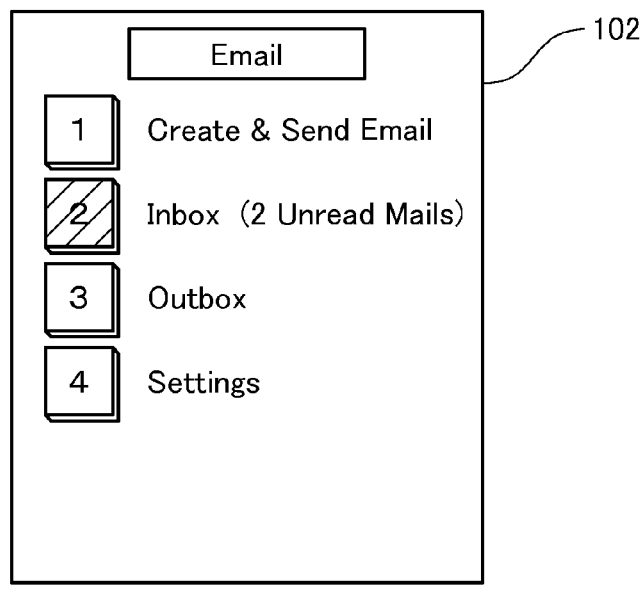
FIG. 8 shows one example of a general email option menu opened on the display screen.

FIG. 8 shows one example of the general email option menu opened on the display screen 102. The general email option menu of FIG. 8 has four option buttons '1' to '4'. A function of newly creating and sending a general email is assigned to the option button '1'. A function of browsing received general emails is assigned to the option button '2'. A function of browsing sent general emails is assigned to the option button '3'. A function of performing various settings related to general emails is assigned to the option button '4'. When there is any unread general email, the number of unread emails is shown next to the label 'Inbox' of the option button '2'. In the illustrated example of FIG. 8, there are two unread emails. The user operates the cursor buttons 104d and the select button 104e shown in FIG. 6 to select the option button '2' 'Inbox'. A list of received general emails stored in the inbox is then displayed on the display screen 102.

According to the concrete procedure, the user's button operations are transmitted via the button key driver 124 and the operating system to the active application program (the application A of performing the general email function in this example). The application A retrieves received general email data in its own exclusive data area and displays information stored in the headers of the respective general email data on the display screen 102. The header of each general email data includes information for identifying the reading status (read or unread), the sender, and the subject line of the general email. When the user of the information terminal device 100 presses the option button '2' 'Inbox' shown in FIG. 8, these pieces of information stored in the headers of the respective general email data are read and displayed on the display screen 102. The information terminal device 100 of the embodiment is also capable of dealing with confidential emails. No piece of information relating to the confidential emails is, however, included in the inbox, because of the following reason.

In the information terminal device 100 of the embodiment, the confidential email function for dealing with confidential emails is enabled by execution of a different application program (application B in this example) from the application program (application A in this example) for dealing with the general emails, as described later in detail. General email data are stored in the exclusive data area of the application A, whereas confidential email data are stored in the exclusive data area of the application B. As described previously with reference to FIG. 3, no application program is allowed to read and write data from and into an exclusive data area of another application program. The user's press of the option button '2' 'Inbox' in the opened general email option menu reads only the general email data stored in the exclusive data area of the application A and displays the general email data on the display screen 102. Storage of the general email data and the confidential email data in different areas ensures mutual discrimination. One possible modification may set identification information representing either the general email or the confidential email in the header of each email data. This identification information included in the header of each email data is used for identification of the email data. This modified technique enables extraction of only general email data or extraction of only confidential email data, even when the general email data and the confidential email data are mixed in one identical area.

The technique of the embodiment stores general email data and confidential email data in different areas and accordingly does not require setting of the identification information representing either the general email or the confidential email in the header of each email data. Even when any third person decodes the headers of the general email data, this technique effectively prevents the third person from noticing the presence of confidential email data.

Figure 9:
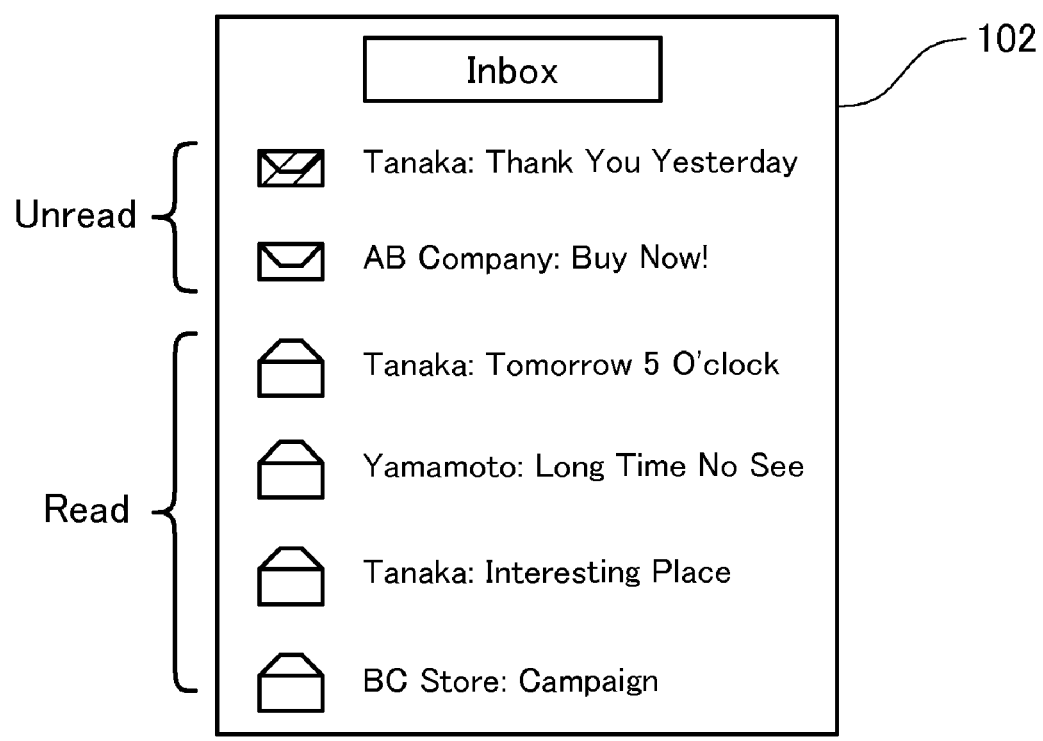
FIG. 9 shows a displayed list of general emails stored in an inbox on the display screen.

FIG. 9 shows a displayed list of general emails stored in the inbox on the display screen 102. In the illustrated example, six incoming mails are shown on the display screen 102. The incoming mails represent received emails (general emails) stored in the inbox. When there are any other non-displayed incoming mails, the window on the display screen 102 is scrolled up or down with the upward or downward cursor button 104d to display such incoming mails. An envelope graphic showing the reading status (read or unread) is added at the top of each incoming mail. An open envelope graphic shows that the incoming mail has already been read. A closed envelope graphic shows that the incoming mail has still been unread. In the general email option menu of FIG. 8, the window shows the presence of two unread emails in the inbox. Two incoming mails in the inbox are shown as 'unread' in FIG. 9.

The sender and part of the subject line of each incoming mail follow the envelope graphic representing the reading status, read or unread, in the inbox window on the display screen 102. The user checks the information of the inbox window to be readily informed of the sender and the message subject of each incoming mail. The user then operates the cursor buttons 104d shown in FIG. 6 to position the cursor at a desired incoming mail for the detailed display and presses the select button 104e to select the desired incoming mail. The contents of the selected incoming mail are read from the exclusive data area and are shown on the display screen 102. When the selected incoming mail has the reading status 'unread', the information in the header is overwritten to the reading status 'read'.

In the illustrated example of FIG. 9, a second incoming mail and a bottom incoming mail are advertising emails sent respectively sent from AB Company and BC Store. When the user selects these advertising emails, the conventional advertisements are shown on the display screen 102. The incoming mail from AB Company is, however, not a real advertising email but is used to inform the user of arrival of a confidential email (hereafter this incoming mail is referred to as liaison mail). The legal user of the information terminal device 100 naturally knows that the advertising email from AB Company is the liaison mail and is thus immediately notified of arrival of a new confidential email. The advertising email from AB Company has no apparent difference from the advertising email from BC Store. No third person thus specifically gives attention to the liaison mail included in advertising emails and is notified of the presence of confidential emails.

The sender of the liaison mail may not be fixed to one but may be any of multiple preset senders. The advertising email sent from any of such preset senders may be regarded as the liaison mail. Setting the multiple senders of the liaison mail desirably prevents reception of the unnaturally large number of advertising emails from one specific sender and thus more effectively conceal the presence of confidential emails.

With referring back to FIG. 7, after the display of the general email option menu on the display screen 102 (step S100), the general email processing flow changes the display on the display screen 102 in response to the user's operations of the operation buttons 104 as described above (step S102). The general email processing flow then determines whether a back button is pressed (step S104). The leftward cursor button 104d is assigned as the back button and is operated to return the display on the display screen 102 to the previous state. When the user of the information terminal device 100 presses the back button (step S104: yes), the display on the display screen 102 is returned to the previous state (step S106). For example, the list of incoming mails in the inbox in the selectable manner shown in FIG. 9 is opened by selection of the option button '2' 'Inbox' in the general email option menu of FIG. 8. The user's press of the back button returns the display to the previous state and shows the general email option menu of FIG. 8 again. The user's press of the back button during display of the contents of a selected incoming mail on the display screen 102, the display on the display screen 102 is returned to the list of incoming mails in the inbox in the selectable manner shown in FIG. 9.

Upon determination of no press of the back button (step S104: no), on the other hand, the general email processing flow goes back to step S102 to change the display on the display screen 102 in response to the user's operations of the operation buttons 104. Whenever the user selects the option button 'Email' in the option menu of FIG. 5, the above series of processing is repeated to implement the general email-related operations.

E. Confidential Email-Related Operations

The function of dealing with confidential emails (confidential email function) is also installed in the information terminal device 100 of the embodiment. The confidential email function enables the user to create, receive, and send confidential emails on the information terminal device 100 without notifying any third person of the presence of such confidential emails. The option menu does not include any option button for activating the confidential email function, so that the confidential email function is not activated by simple selection of the corresponding option button in the option menu unlike the general email function. The confidential email function is activated by the user's manipulation of the operation buttons 104 in a preset order. This arrangement effectively prevents any third person from realizing that the information terminal device 100 of the embodiment is capable of dealing with confidential emails. When a confidential email arrives, the information terminal device 100 receives the liaison mail to inform the user of arrival of the confidential email. Any third person recognizes the liaison mail as one of the conventional advertising emails and accordingly does not notice the presence of confidential emails.

The information terminal device 100 of the embodiment is set to activate the confidential email function in response to the user's manipulation of some of the multiple operation buttons 104 (see FIG. 6) in a preset order. For example, when the user presses '*', '5', '#', and '0' buttons in this order among the multiple operation buttons 104 shown in FIG. 6, the button key driver 124 detects the user's button operations in the preset order and transmits the detection to the operating system. The operating system then activates the relevant application program for enabling the confidential email function (for example, the application B shown in FIG. 3).

Figure 10:
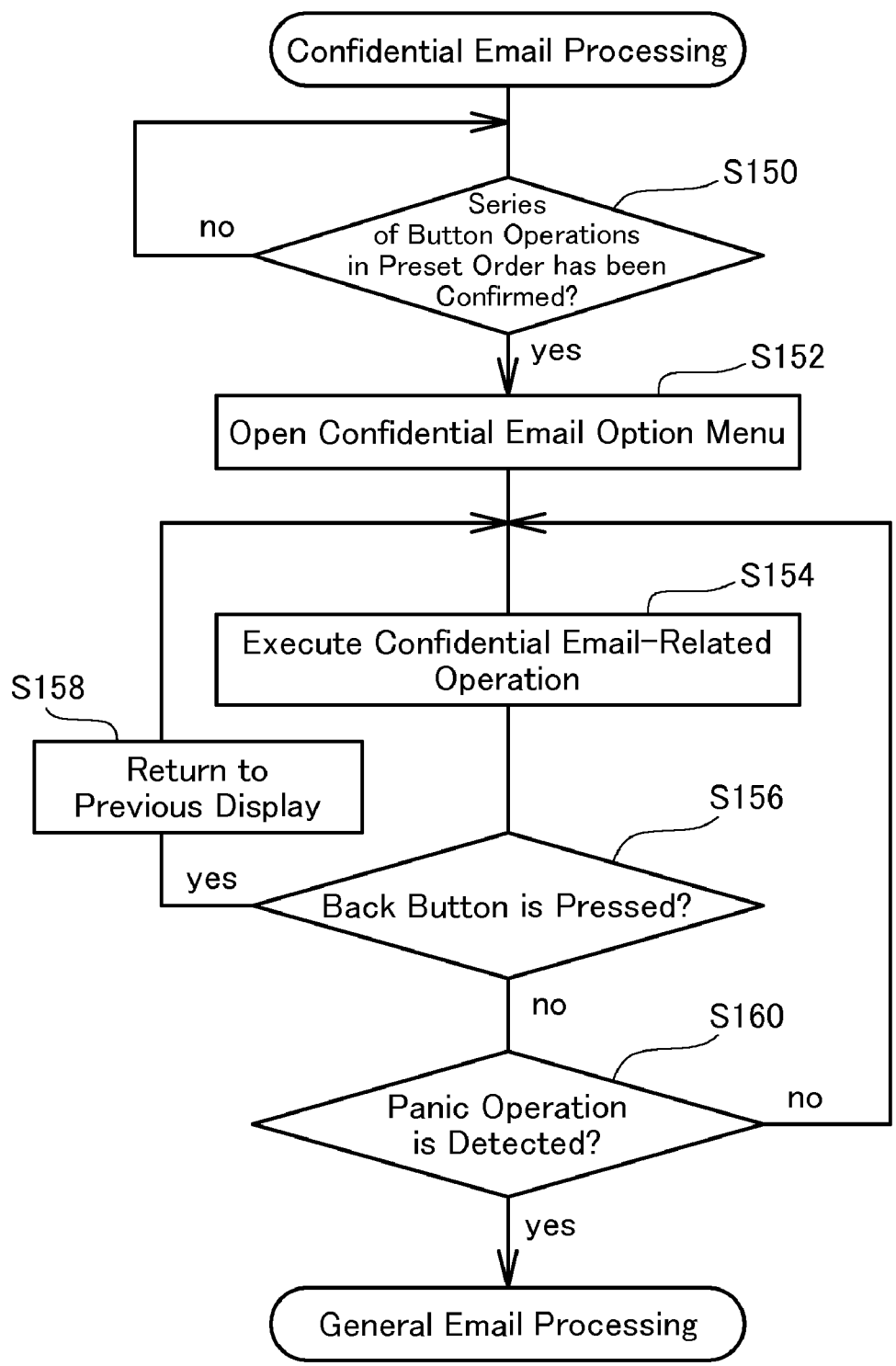
FIG. 10 is a flowchart showing a series of confidential email processing executed to attain a confidential email function.

FIG. 10 is a flowchart showing a series of confidential email processing executed to attain the confidential email function. The confidential email processing flow first determines whether the operation buttons 104 have been operated in a preset order (step S150). In response to no detection of such button operations in the preset order (step S150: no), the confidential email function is not enabled but stands by for detection of the button operations in the preset order. In response to detection of the button operations in the preset order (step S150: yes), on the other hand, the confidential email function is enabled. The processing of step S150 is interrupt processing to stand by for detection of the button operations in the preset order and to start subsequent series of the confidential email processing in response to detection of the button operations in the preset order. When the user of the information terminal device 100 manipulates the operation buttons 104 in the preset order, the button key driver 124 detects the user's button operations and transmits the detection to the operating system. The operating system then generates an interrupt to activate the application B and enable the confidential email function. The application B is activated to display an option menu for dealing with confidential emails (confidential email option menu) on the display screen 102.

The series of button operations for activating the application program to enable the confidential email function (the application B in this example) is not restricted to the operations to enter a preset password, for example, '*5#0', but may be operations of any of the multiple operation buttons 104 set on the information terminal device 100 in a preset order. The series of button operations may include an extraordinary button operation that never occurs in the ordinary use state, for example, a press of an inactive function select button among the three function select buttons 104a, 104b, and 104c or simultaneous presses of the call start button 104f and the hang-up button 104g. In an information terminal device with a voice recognition function or an image recognition function, part or whole of such button operations may be replaced by voice recognition or image recognition.

When the user's entry of a password is required, a password entry window is generally opened on the display. In the information terminal device 100 of the embodiment, however, the display on the display screen 102 is kept unchanged during the user's button operations in the preset order. The confidential email option menu abruptly opens on the display screen 102 only after detection of the correct series of button operations in the preset order. If any third person accidentally performs part of the required button operations, no change of the display on the display screen 102 misinforms the third person of invalidation of the button operations. The third person accordingly stops the further button operations. This effectively prevents the accidental display of the confidential email option menu. In the structure of displaying the password entry window on a start of the series of button operations, the third person's accidental start of the series of button operations may lead to a change of the display to the password entry window. This may cause the third person to realize the presence of the concealed function, analyze the inside of the information terminal device 100, and eventually have access to the stored confidential emails. In the information terminal device 100 of the embodiment, however, the display on the display screen 102 has no change during the series of button operations in the preset order. The confidential email option menu suddenly opens on the display screen 102 only after confirmation of the correct series of button operations in the preset order. This arrangement effectively prevents such accidental leakage of the confidential emails.

Figure 11:
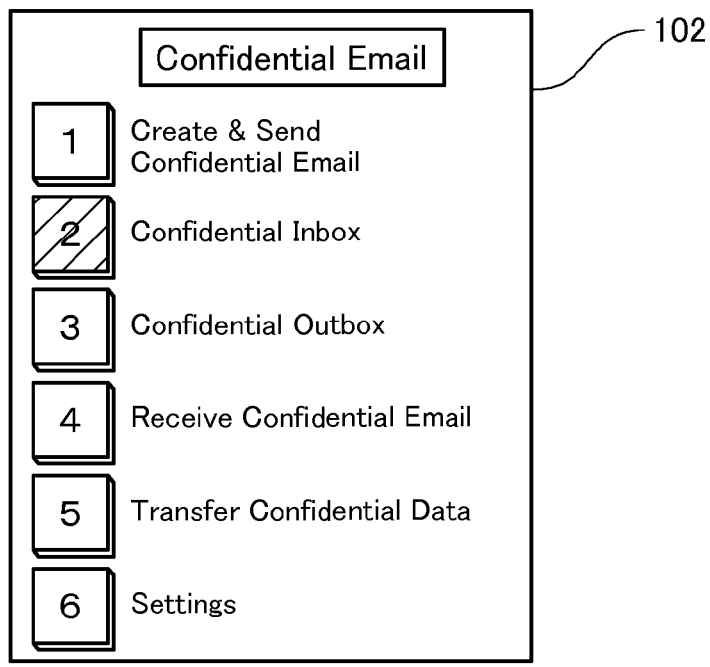
FIG. 11 shows one example of a confidential email option menu opened only in response to correct series of button operations in a preset order.

FIG. 11 shows one example of the confidential email option menu opened on the display screen 102 on a start of the confidential email processing. The confidential email option menu of the illustrated example has six option buttons '1' to '6'. A function of newly creating and sending a confidential email is assigned to the option button '1'. A function of browsing received confidential emails is assigned to the option button '2'. A function of browsing sent confidential emails is assigned to the option button '3'. The functions assigned to the option buttons '1' to '3' in the confidential email option menu deal with the confidential emails but are otherwise equivalent to the functions assigned to the option buttons '1' to '3' in the general email option menu described previously with reference to FIG. 8. A function of receiving confidential emails is assigned to the option button '4'. A function of transferring confidential data to another information terminal device is assigned to the option button '5'. A function of performing various settings related to confidential emails is assigned to the option button '6'. Such a confidential email option menu is opened on the display screen 102 at step S152 in the confidential email processing flow of FIG. 10. The details of the functions assigned to the respective buttons in the confidential email option menu will be described later.

Similar to the general email processing flow of FIG. 7, after display of the confidential email option menu, the confidential email processing flow changes the display on the display screen 102 in response to the user's selection of a desired button in the confidential email option menu to activate a corresponding confidential email-related function (step S154 in FIG. 10).

Like the general email processing flow of FIG. 7, the confidential email processing flow determines whether the back button is pressed (step S156), while changing the display on the display screen 102 in response to the user's button operations. In the confidential email processing, the leftward cursor button 104d is also assigned as the back button. When the user of the information terminal device 100 presses the back button (step S156: yes), the display on the display screen 102 is returned to the previous state (step S158).

Upon determination of no press of the back button (step S156: no), on the other hand, the confidential email processing flow detects a panic operation (step S160). The panic operation is the user's operation of a selected one of the operation buttons 104 in a predetermined way. In this embodiment, a long press of the '*' button (continuous press over 2 seconds) is set to the panic operation. In the case of no detection of such a panic operation (step S160: no), the confidential email processing flow goes back to step S154.

After display of the confidential email option menu shown in FIG. 11, the above series of confidential email processing is repeatedly performed to change the display on the display screen 102 in response to the button operations by the user of the information terminal device 100 (step S154), to detect a press of the back button (step S156) and the panic operation (step S160), and, in the event of a press of the back button (step S156: yes), to return the display on the display screen 102 to the previous state (step S158). In the case of detection of the panic operation (step S160: yes) during the repeated execution, the processing flow immediately terminates the confidential email processing of FIG. 10 and starts the general email processing of FIG. 7. When the user performs the preset panic operation (for example, a long press of the '*' button) even in the middle of the confidential email-related operation, the confidential email-related operation is immediately terminated and the general email processing starts to open the general email option menu of FIG. 8 on the display screen 102.

As described later, a window opened on the display screen 102 during the confidential email-related operation is different from the window opened during the general email-related operation. Any third person accidentally or intentionally glancing at the window for confidential emails may notice the presence of confidential emails. This may lead to analysis of the internally stored data and leakage of confidential data. When the third person has the chance of glancing at the display on the display screen 102 during the user's confidential email-related operation, the information terminal device 100 of the embodiment immediately changes the display on the display screen 102 in response to detection of the user's panic operation. This effectively prevents the third person from realizing the presence of confidential emails.

The procedure of this embodiment immediately terminates the confidential email processing in response to detection of the panic operation as shown in FIG. 10. One possible modification may not terminate the confidential email processing but may simply change the display on the display screen 102. A window for creation of a new general email may be registered instead of the general email option menu and may be opened on the display screen 102 in response to detection of the panic operation. In this modified application of simply changing the display on the display screen 102 in response to detection of the panic operation, the display may be returned to the previous state by manipulation of a preset button in a predetermined manner or only by the correct series of button operations in the preset order.

The display on the display screen 102 may automatically be changed to the preset state in the event of no operation for or over a predetermined long time, as well as in response to detection of the panic operation. In this case, it is desirable to return the display on the display screen 102 to the previous state only by the correct series of button operations in the preset order. It is generally unlikely to receive no operation for a sufficiently long time during the display of the window for confidential emails. There is accordingly a high possibility that some abnormal event or emergency occurs. In such circumstances, the window for confidential emails is not reopened until the correct series of button operations in the preset order. This effectively prevents leakage of confidential data.

Until detection of the panic operation, the required confidential email-related operation is performed in response to the user's button operation in the confidential email option menu of FIG. 11.

E-1. Process of Receiving Confidential Email

As shown in FIG. 11, an option menu 'Confidential Inbox' is assigned to the option button '2' in the confidential email option menu. In response to the user's selection of the option button '2', a list of incoming confidential emails is displayed on the display screen 102 in a selectable manner. The button key driver 124 detects the press of the option button '2' and transmits the detection to the corresponding application program (the application B of FIG. 3 in this example) via the operating system. The application B reads the incoming confidential emails stored in its own exclusive data area.

Figure 12:
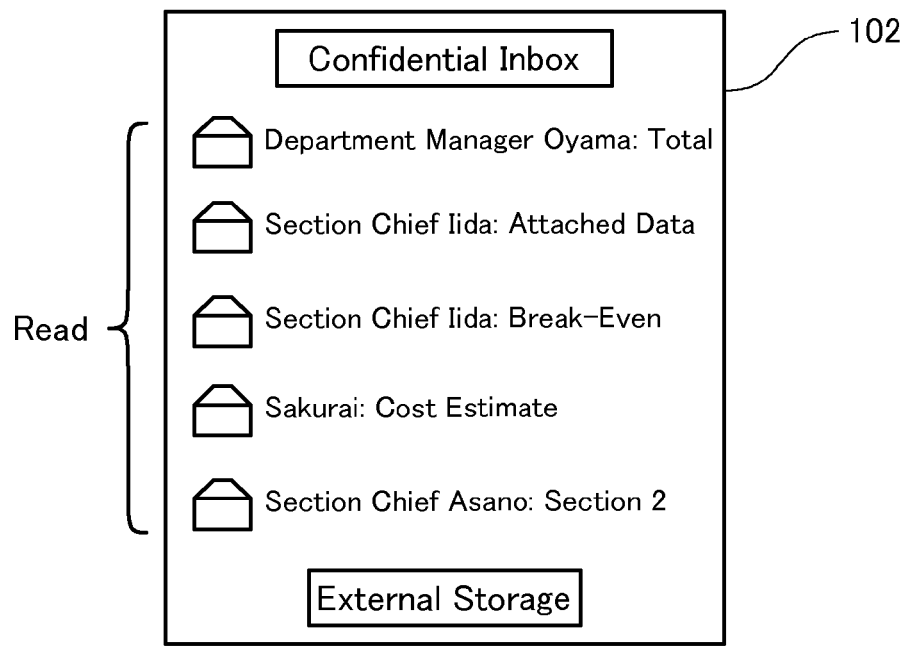
FIG. 12 shows a displayed list of confidential emails stored in a confidential inbox on the display screen.

FIG. 12 shows a displayed list of confidential emails stored in a confidential inbox on the display screen 102. Like the inbox of the general email option menu described previously with reference t FIG. 9, an envelope graphic showing the reading status (read or unread) is added at the top of each incoming confidential email. The sender and part of the subject line of the incoming confidential email follow the envelope graphic representing the reading status, read or unread.

As described above with reference to FIG. 9, the advertising email from AB Company is the liaison mail showing arrival of a new confidential email. The legal user of the information terminal device 100 receiving the liaison mail is notified of arrival of a new confidential email and operates the series of buttons in the preset order to open the confidential email option menu shown in FIG. 11. When the user presses the option button '2' in the confidential email option menu to open the confidential inbox at this moment, however, all the incoming confidential emails stored in the confidential inbox have been read as shown in FIG. 12. Namely there is no confidential email newly received and stored as an unread mail in the confidential inbox. This is because the information terminal device 100 of the embodiment requires a specific operation to receive an arrived confidential email, unlike the general emails. The function of receiving confidential emails is thus assigned to the option button '4' in the confidential email option menu of FIG. 11.

Figure 13:
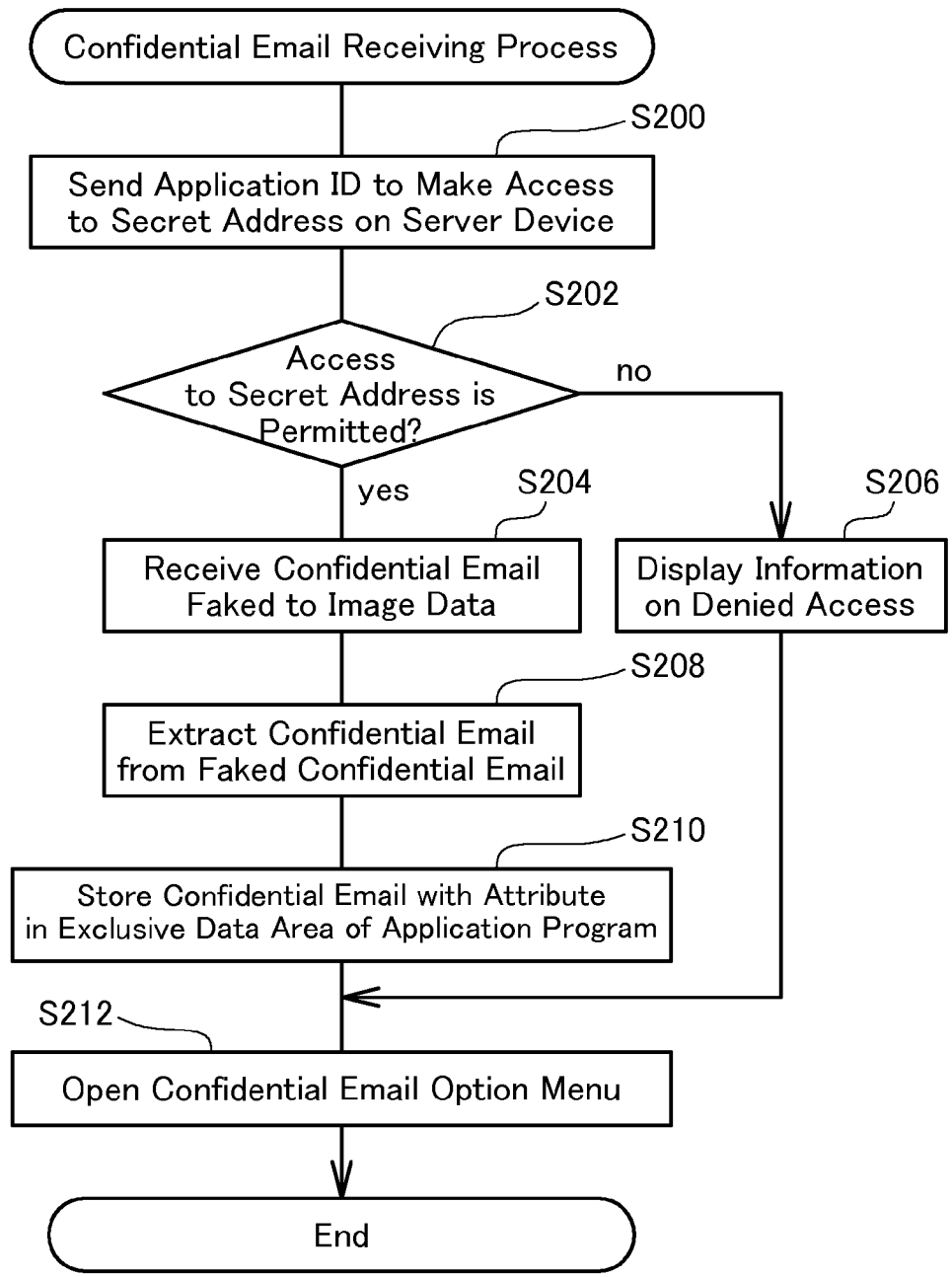
FIG. 13 is a flowchart showing a confidential email receiving process.

FIG. 13 is a flowchart showing a confidential email receiving process. This process is executed by the application B in response to selection of the option button '4' 'Receive Confidential Email' on the confidential email option menu shown in FIG. 11.

On a start of the confidential email receiving process, the information terminal device 100 sends an application ID to make access to a secret address set on the server device 50 on the Internet 90 (step S200). The application ID is a number (or a symbol) used for identification of each application program. The confidential email function of this embodiment is executed by the application program B. The same application B may be installed in multiple different information terminal devices 100. Different application IDs are set to the same application B installed in the different information terminal devices 100.

The application ID is set by the user of the information terminal device 100 when an application program is newly installed in the information terminal device 100. One identical application ID should not be set to different application programs. The information terminal device 100 makes access to the management server device 50 on the Internet 90 and registers the setting of an application ID in the server device 50 at the time of installation of each application program in the information terminal device 100. The application program is activatable only after confirmation of no overlap of the application ID and accepted registry of the application ID in the server device 50. After the accepted registry of the application ID in the server device 50, the appliation B stores the registered application ID in its own exclusive data area (see FIG. 3).

When accepting registry of the application ID, the management server device 50 sets an exclusive data area therein and issues a unique secret address to the registered application ID. The secret address issued by the server device 50 is sent to the information terminal device 100 via the Internet 90 and is stored in the exclusive data area of the application B (see FIG. 3). At step S200 in the confidential email receiving process of FIG. 13, the information terminal device 100 reads the application ID and the secret address stored in the exclusive data area of the application B and makes access to the secret address set on the server device 50 on the Internet 90.

A unique secret address is issued for each application ID as mentioned above. The server device 50 denies access unless the information terminal device 100 makes the access to the valid secret address with the accurate application ID. The information terminal device 100 identifies permission or denial of the access to the secret address (step S202). In the event of denied access by the server device 50 (step S202: no), the information terminal device 100 informs the user of the denied access on the display screen 102 (step S206), reopens the confidential email option menu of FIG. 11 (step S212), and terminates the confidential email receiving process. In this case, the user of the information terminal device 100 checks the reason for the denied access by the server device 50 (for example, a change of the application ID or the secret address) and selects the option button '4' again in the reopened confidential email option menu.

When the information terminal device 100 makes access to the valid secret address with the accurate application ID, the server device 50 permits the access and sends information on the permitted access (step S202: yes). The information terminal device 100 receives a confidential email sent subsequent to the information on the permitted access from the server device 50 (step S204). The server device 50 retrieves any unsent confidential email among confidential emails stored at the secret address, fakes the retrieved unsent confidential email to image data, and sends the fake image data with the confidential email to the information terminal device 100 via the Internet 90. The concrete procedure of faking a confidential email to image data embeds the confidential email in image data in an apparently unnoticeable manner. The fake image data with the embedded confidential email is displayed as a simple image by the browser. Any third person accordingly does not notice the confidential email embedded in the image data. The details of the processing executed by the server device 50 will be described later.

In this embodiment, the application ID is stored in correlation to the secret address in the server device 50, and the server device 50 denies access unless the information terminal device 100 makes the access to the valid secret address with the accurate application ID. In one possible modification, a number or symbol assigned for identification of the information terminal device 100 with installation of the application program (hereafter may be referred to as device ID) may be stored in correlation to the secret address in the server device 50. The information terminal device 100 sends the device ID, instead of the application ID, and makes access to the secret address set on the server device 50.

Figure 14:
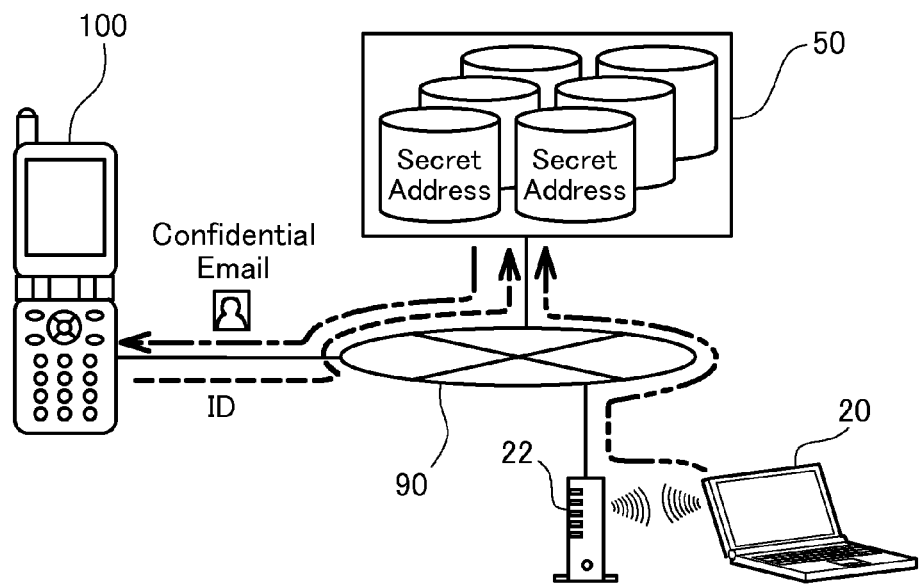
FIG. 14 conceptually illustrates transmission of a confidential email from a server device to the information terminal device.

FIG. 14 conceptually illustrates transmission of a confidential email from the server device 50 to the information terminal device 100. The arrow of the broken line shows transmission of an application ID and access from the information terminal device 100 to its secret address set on the server device 50 on the Internet 90. When the access to the valid secret address is permitted by the server device 50 and when any unsent confidential email is present at the valid secret address, the confidential email is faked to image data and is sent to the receiver information terminal device 100. The arrow of the one-dot chain line shows transmission of the fake image data with the confidential email from the server device 50 to the receiver information terminal device 100. A confidential email sent from a sender information terminal device, for example, the laptop 20 or a cell phone, has been stored in advance at the secret address assigned to the receiver information terminal device 100 by utilizing the confidential email sending function described later.

The confidential email receiving process of FIG. 13 receives a faked confidential email (step S204) and extracts a confidential email from the faked confidential email (step S208). Since the confidential email is faked to image data in this example, character data embedded as the confidential email is extracted from the fake image data. Extraction of a confidential email from a faked confidential email is reverse to generation of a faked confidential email by embedding a confidential email in image data. The process of extracting the confidential email from the faked confidential email is described later with the process of faking the confidential email to the faked confidential email.

The confidential email extracted from the faked confidential email is stored in the exclusive data area of the application B (step S210). In the information terminal device 100 of the embodiment, the application B deals with confidential emails, while the application A deals with general emails. The confidential emails and the general emails are stored in separate exclusive data areas under management of the different application programs. Separate storage in different exclusive data areas prevents confusion of the confidential emails with the general emails. The confidential emails and the general emails may not be stored in separate storage areas but may be stored in a distinguishable manner in an identical storage area. One example of such modification adds an attribute for identifying a confidential email to the header of each confidential email. This allows mixed storage of confidential emails and general emails in the distinct manner in the same storage area.

After storage of the confidential email received from the server device 50 (step S210), the information terminal device 100 opens the confidential email option menu on the display screen 102 (step S212) and terminates the confidential email receiving process of FIG. 13. When there is any unread confidential email, the number of unread emails is shown next to the label 'Confidential Inbox' on the display screen 102.

Figure 15:
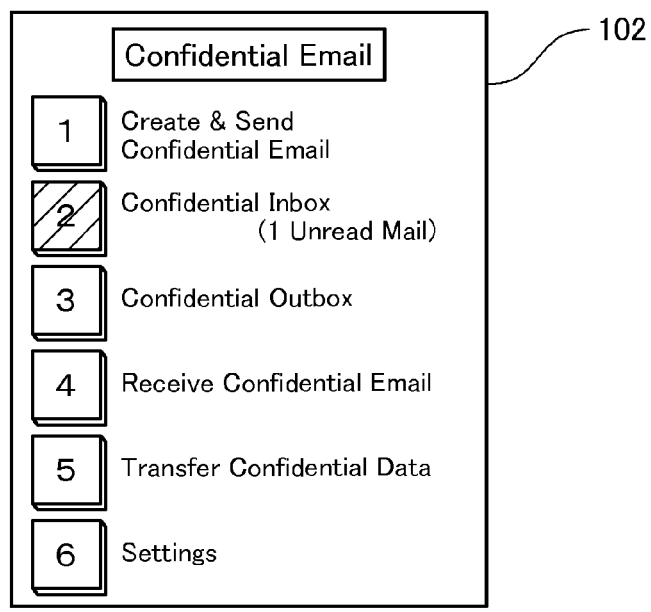
FIG. 15 shows the confidential email option menu reopened on the display screen after the confidential email receiving process.

FIG. 15 shows the confidential email option menu reopened on the display screen 102 after the confidential email receiving process. As clearly shown by comparison with the display on the display screen 102 before the confidential email receiving process (see FIG. 11), one unread email is added to the confidential inbox by the confidential email receiving process. In the general email option menu described above with reference to FIG. 8, the information terminal device 100 automatically receives an unread email and stores the unread email in the inbox without requiring the user's any specific email receiving operation. In the confidential email option menu of FIG. 11, on the other hand, the user's specific email receiving operation, for example, a press of the option button '4', is required to receive an unread email from the server device 50. The legal user of the information terminal device 100 opens the general email option menu to check reception of the liaison mail, operates the series of buttons in the preset order to open the confidential email option menu of FIG. 11, and presses the option button '4' on the display screen 102 to receive an unread confidential email from the server device 50. After receiving the unread confidential email, a new list of incoming confidential emails stored in the confidential inbox is displayed in response to the user's selection of the option button '2' in the confidential email option menu.

In the arrangement of this embodiment, the user's press of the option button '4' in the confidential email option menu of FIG. 11 is required to receive an unread confidential email. In one modified arrangement, when the confidential email option menu of FIG. 11 is opened by the series of button operations in the preset order, the information terminal device 100 may automatically access to the server device 50 without the press of the option button '4' to check the presence of any unread confidential email and, when there is any, receives the unread confidential email.

Figure 16:
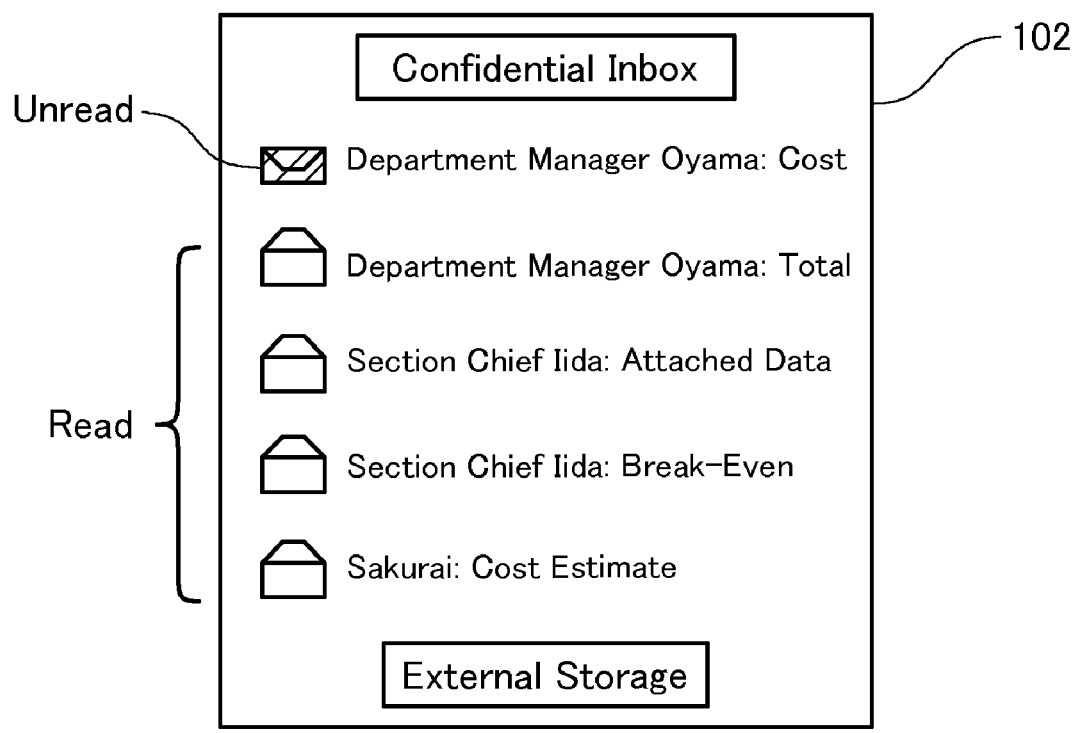
FIG. 16 shows a displayed new list of confidential emails stored in the confidential inbox on the display screen after reception of unread confidential emails.

FIG. 16 shows a displayed new list of confidential emails stored in the confidential inbox on the display screen 102 after reception of unread confidential emails. As the result of the confidential email receiving process described above, an unread confidential email sent from Department Manager Oyama has been stored in the confidential inbox. When the user operates the cursor buttons 104*d* and the select button 104*e* to select the unread confidential email, the information terminal device 100 reads the contents of the selected confidential email from the exclusive data area of the application B and displays the contents of the confidential email on the display screen 102.

The server device 50 fakes a confidential email and sends the faked confidential email to the information terminal device 100 according to the procedure described below.

Figure 17:
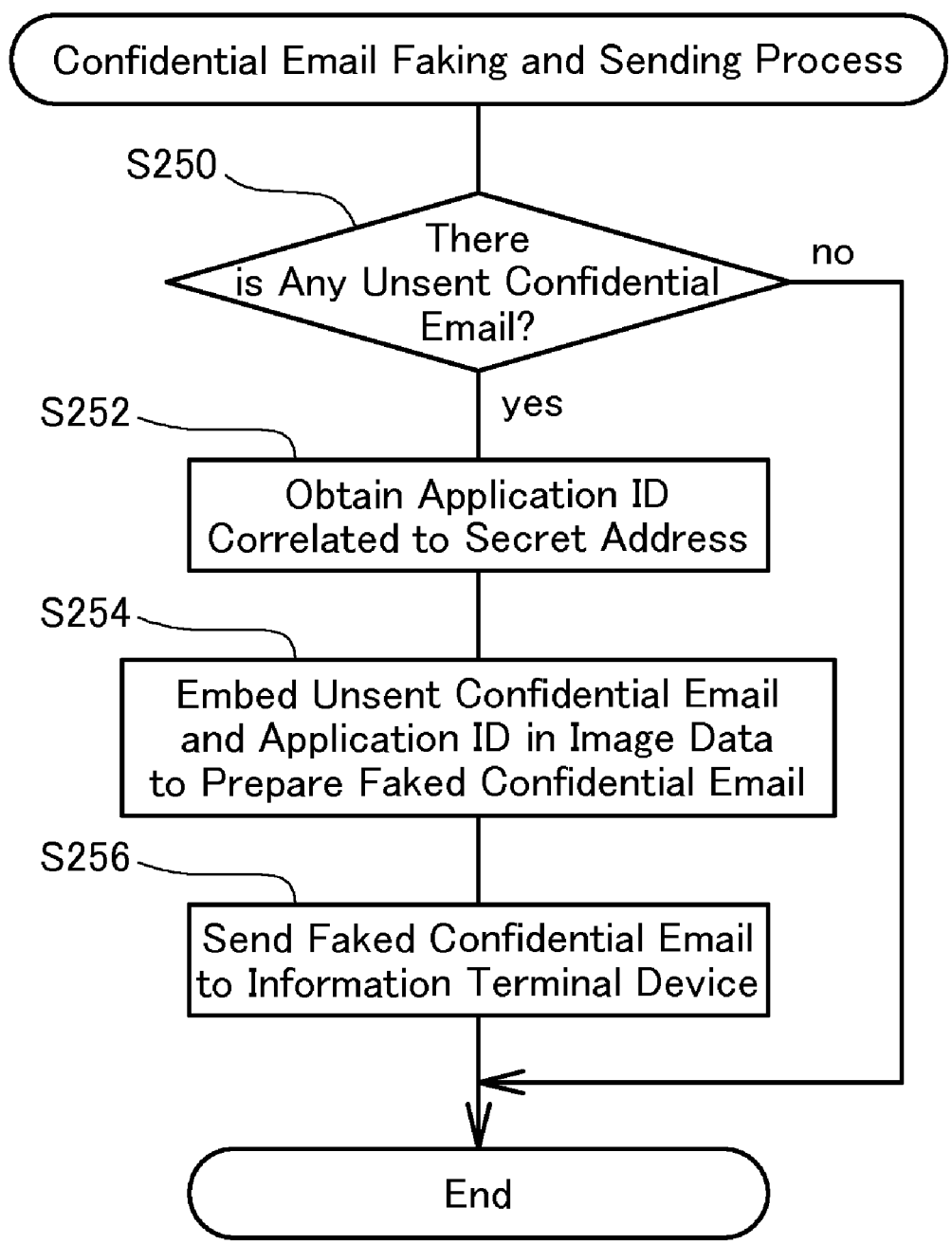
FIG. 17 is a flowchart showing a confidential email faking and sending process executed by the server device to fake a confidential email stored at a secret address and send the faked confidential email to the information terminal device.

FIG. 17 is a flowchart showing a confidential email faking and sending process executed by the server device 50 to fake a new confidential email stored at a secret address and send the faked confidential email to the information terminal device 100. The server device 50 executes this confidential email faking and sending process on permission of the access from the information terminal device 100 in the confidential email receiving process described above.

On a start of the confidential email faking and sending process, the server device 50 identifies the presence or the absence of any unsent confidential email at the secret address accessed by the information terminal device 100 (step S250). When the server device 50 has been set to delete all the sent confidential emails from the secret address, all confidential emails currently stored at the secret address are identified as unsent. When the server device 50 has been set to keep all the sent confidential emails at the secret address, on the other hand, unsent confidential emails should be stored to be distinctive from the sent confidential email. The applicable technique for this purpose writes information for identifying the sending status (sent or unsent) in the header of each confidential email or separately stores unsent confidential emails and sent confidential emails in different storage areas. When there is no unsent confidential email at the secret address (step S250: no), the confidential email faking and sending process is terminated immediately.

When there is any unsent confidential email at the secret address (step S250: yes), on the other hand, the server device 50 obtains the application ID correlated to the secret address (step S252). As described above, a specific application ID is allocated to the application program for performing the confidential email function (application B in this example) and is registered in the server device 50 at the time of installation of the application program in the information terminal device 100. A unique secret address is issued for each application ID. The correlation map of the application ID to the secret address is stored in the server device 50. The server device 50 reads the application ID stored in correlation to the secret address accessed by the information terminal device 100 at step S252 in the confidential email faking and sending process of FIG. 17.

Figure 18:
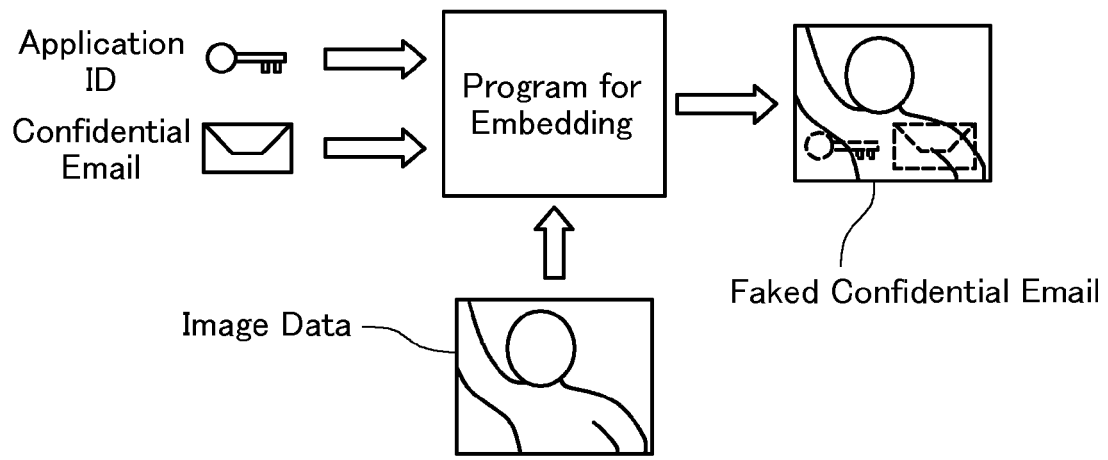
FIG. 18 conceptually illustrates preparation of a faked confidential email by embedding a confidential email and an application ID in image data.

The server device 50 then embeds the unsent confidential email stored at the secret address and the obtained application ID into image data (step S254). FIG. 18 conceptually illustrates preparation of a faked confidential email by embedding a confidential email and an application ID in image data. A specific program for embedding another data into image data is stored in the server device 50. The specific program receives specified image data to be used for faking, an unsent confidential email, and an obtained application ID and embeds the confidential email and the application ID into the image data to prepare a faked confidential email. The faked confidential email is apparently image data and is opened as a conventional image by a general browser or equivalent application program.

Any of diverse methods may be adopted to embed the confidential email and the application ID into image data. Data of a specific data structure, such as image data or sound data, generally has a preset data area for storing its data body, which is to be read out as an image or sound. The confidential email and the application ID may be written into another area, while the data body of the image data or the sound data remains in the preset data area. This arrangement allows the general browser or equivalent application program to open the fake image data or sound data and reproduce only its original data body. The confidential email and the application ID is thus effectively faked to fake image data or sound data.

When there are multiple unsent confidential emails at the secret address, each of the confidential emails may be embedded separately in one image data (or one sound data) or the confidential emails may be embedded integrally in one identical image data (or one identical sound data). Embedding a large number of confidential emails, however, undesirably increases the total data volume relative to the data volume of the original image data (or sound data) and may cause a third person to notice the presence of another data embedded in the image data or sound data. It is thus desirable to embed an adequate number of confidential emails within a preset data capacity according to the data volume of the original image data (or sound data).

The lower bits of image data or sound data may be set as a specific area for storage of the confidential email. RGB image data uses 1-byte data for each of the three color components R, G, and B to express the color. For example, a confidential email may be dividedly stored at the lower 2 bits of image data. The confidential email is reconstructed by collecting the data divisions separately stored at the lower 2 bits. The image data with the embedded confidential email appears as image data with noise in the lower 2 bits and has substantially the same data structure and data volume as those of the original image data. This technique enables the confidential email and the application ID to be faked favorably in an unnoticeable manner.

After preparation of the faked confidential email by faking the confidential email to the image data, the server device 50 sends the faked confidential email to the information terminal device 100 via the Internet 90 (step S256) and terminates the confidential email faking and sending process of FIG. 17.

While the server device 50 executes the confidential email faking and sending process, the information terminal device 100 executes the confidential email receiving process of FIG. 13 to receive the faked confidential email sent from the server device 50 (step S204) and extracts the confidential email from the faked confidential email (step S208).

The process of extracting a confidential email from a faked confidential email is just reverse to the process of embedding a confidential email in image data to prepare a faked confidential email (see FIG. 18). A specific program is used to read data of the embedded confidential email from the specific area other than the original data storage area. The information terminal device 100 is permitted to extract and read the confidential email from the received faked confidential email only in the case of successful verification of the application ID. Even if a third person accidentally or illegally obtains a faked confidential email, this arrangement effectively prevents the third person from extracting and reading a confidential email from the faked confidential email.

When there are multiple unsent confidential emails at the secret address set on the server device 50, the multiple confidential emails may be sent simultaneously from the server device 50 to the information terminal device 100. The server device 50 may collectively send only one liaison mail corresponding to the multiple confidential emails, instead of sending a liaison mail in response to arrival of each confidential email. In one possible case, after a liaison mail is sent to the information terminal device in response to arrival of a confidential email at a certain secret address but before the information terminal device receives the confidential email, another confidential email may arrive at the same secret address. In this case, the server device 50 may not send a new liaison mail corresponding to the newly arrived confidential email but may use the sent liaison mail for the newly arrived confidential email. The liaison mail appears as an advertising email to prevent the third person from noticing the presence of a confidential email. Frequent reception of advertising emails may cause some suspicion of the third person. The use of one liaison mail for multiple confidential emails, instead of multiple liaison mails, desirably avoids even such suspicion.

As shown in FIG. 16, the confidential inbox window has an option 'External Storage' below the list of incoming confidential emails in the confidential inbox. The function 'External Storage' is enabled by pressing the function select button 104*b* set on the main body of the information terminal device 100 as described previously with reference to FIG. 6. The external storage function is activated to store the confidential emails in the confidential inbox into an eternal storage medium, such as the memory card 112. A third person may readily find the presence of confidential emails stored in a general-purpose storage medium, such as the memory card 112, even under protection of a password. There is accordingly a possibility that the third person may break the password to have illegal access to the confidential data. The information terminal device 100 of this embodiment takes into account this possibility and provides the external storage function to attain safe and secure storage of confidential emails without the potential for leakage of the confidential data. The external storage function will be described later in detail.

E-2. Process of Creating and Sending Confidential Email

The function of creating and sending a new confidential email is activatable in the confidential email option menu. As shown in FIG. 15, this confidential email creating and sending function is assigned to the option button '1' in the confidential email option menu. When the user operates the cursor buttons 104*d* and the select button 104*e* to select the option button '1', the display on the display screen 102 is changed to a confidential email creating and sending window.

Figure 19:
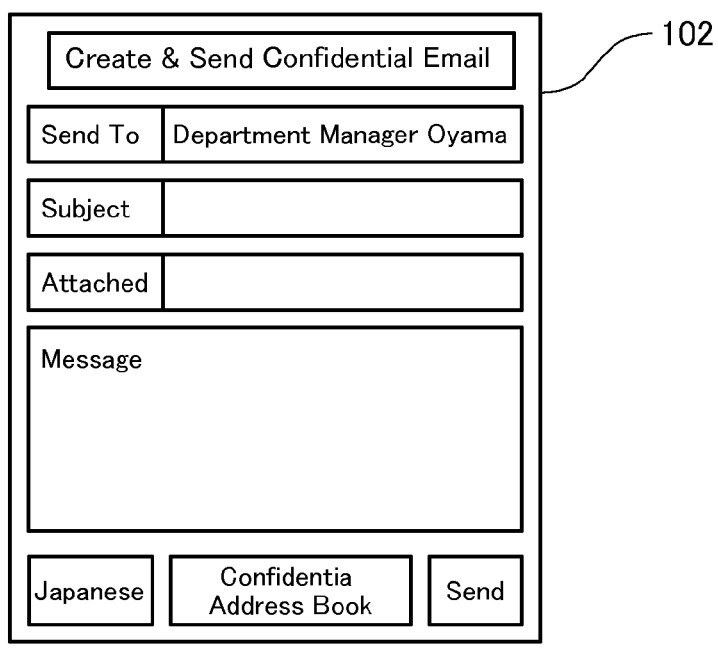
FIG. 19 shows one example of a confidential email creating and sending window opened on the display screen to create and send a new confidential email.

FIG. 19 shows one example of the confidential email creating and sending window opened on the display screen 102 to create and send a new confidential email. As illustrated, the confidential email creating and sending window has an address box for setting the receiver address of a confidential email, a subject box for writing the subject of the confidential email, an attached data box for setting data to be attached to the confidential email, for example, an image or spreadsheet data, and a message box for writing the message of the confidential email. The user operates the cursor buttons 104*d* to shift the cursor to a desired box on the display screen 102 and operates the entry buttons 104*h* (see FIG. 6) to enter a desired character string. A mode switch button provided on the lower left corner of the display screen 102 is clicked to sequentially switch over the input mode of the entry buttons 104*h* in the order of 'Japanese' 'Alphabet', and 'Numerals'. The switchover of the input mode changes the display label of the mode switch button on the display screen 102 in the order of 'Japanese', 'ABC', and '123'. The mode switch button for switching the input mode is provided on the lower left corner of the display screen 102 and is activated by a press of the left function select button 104*a* (see FIG. 6) set on the main body of the information terminal device 100.

A 'Confidential Address Book' button is provided on the bottom center of the display screen 102. When the user shifts the cursor to the address box and activates the 'Confidential Address Book' button, an exclusive address book for confidential emails is read and opened on the display screen 102. The receiver address of the currently created confidential email is written by selection of one of the addresses registered in the exclusive address book. The exclusive address book for confidential emails (confidential address book) is stored in the exclusive data area of the application B (application program executed to enable the confidential email function). Even the presence of the confidential address book is concealed from other application programs and the operating system.

After creation of a confidential email, the user activates a 'Send' button provided on the lower right corner of the display screen 102 to send the created confidential email. The 'Send' button is activated by a press of the right function select button 104*c* set on the main body of the information terminal device 100. The sent confidential email is stored in the exclusive data area of the application B. A press of the option button '3' in the confidential email option menu of FIG. 11 opens a confidential outbox and shows a list of sent confidential emails on the display screen 102.

In the above description, the confidential email creating and sending function is activated by a press of the option button '1' in the confidential email option menu of FIG. 11 to newly create a whole confidential email. Another possible application may first create a general email by the option of the general email option menu of FIG. 8, specify the created general email as a confidential email at the time of transmission (or prior to the creation), and send the confidential email.

Figure 20:
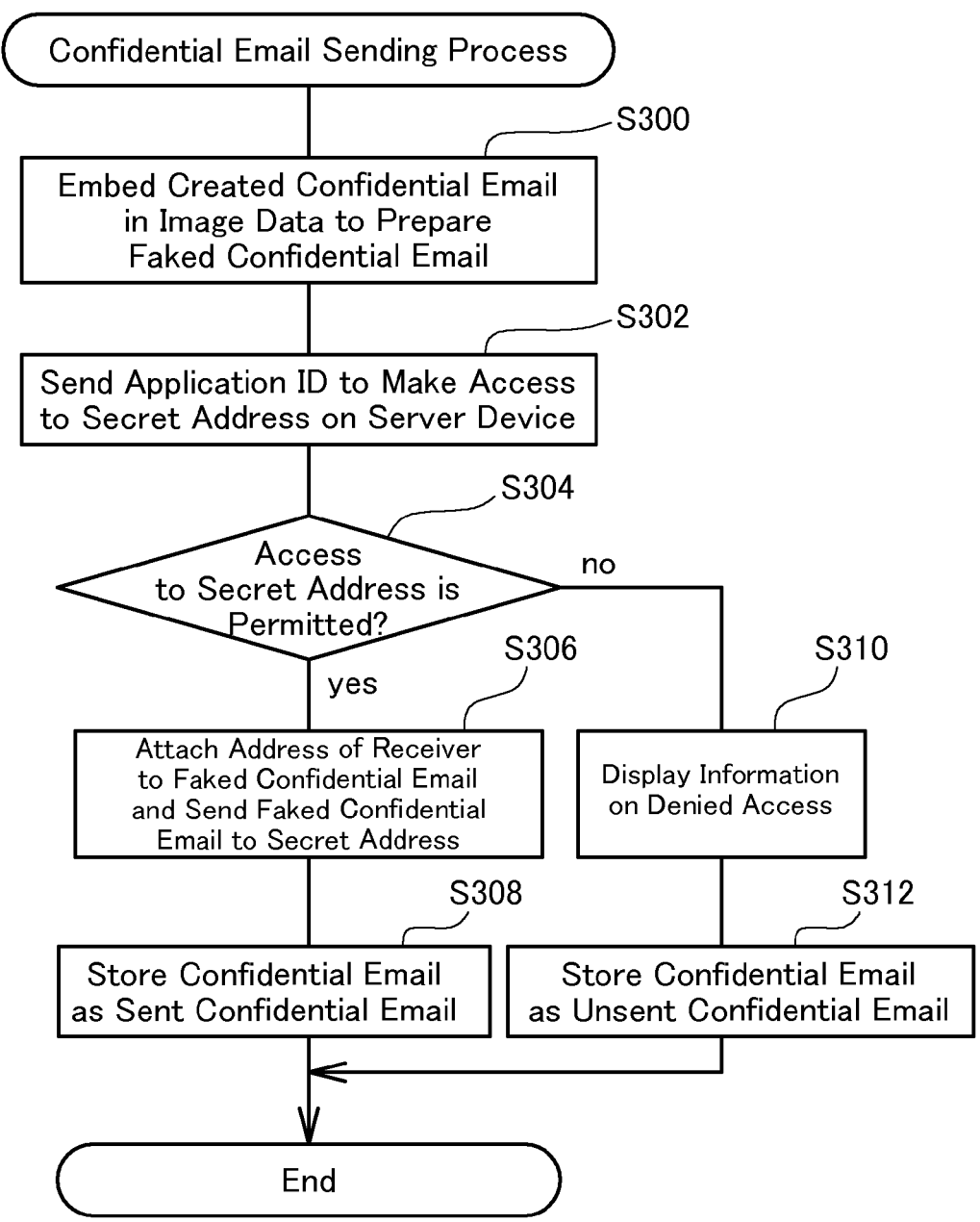
FIG. 20 is a flowchart showing a confidential email sending process executed by the information terminal device to send a created confidential email.

FIG. 20 is a flowchart showing a confidential email sending process executed by the information terminal device 100 to send a confidential email. This process is triggered by selection of the 'Send' button provided on the lower right corner of the display screen 102 after creation of a new confidential email on the confidential email creating and sending window of FIG. 19.

On a start of the confidential email sending process, the application B installed in the information terminal device 100 embeds the created confidential email in image data to prepare a faked confidential email (step S300). The actual procedure of embedding the confidential email in image data to prepare a faked confidential email follows the process of FIG. 18. The application ID stored in the exclusive data area of the application B is read out and embedded together with the confidential email in the image data. The image data used as a fake for embedding the confidential email may be specified in advance or may be selected at random among preset multiple images.

The information terminal device 100 sends the application ID to make access to its secret address set on the server device 50 (step S302). The secret address accessed by the information terminal device 100 has been assigned to the application B of the information terminal device 100 by the server device 50 at the time of installation of the application B in the information terminal device 100. The confidential email sending process sends all confidential emails to the secret address assigned to the application B of the information terminal device 100, irrespective of the receiver addresses of the confidential emails.

The information terminal device 100 identifies permission or denial of the access to its secret address set on the server device 50 (step S304). In the event of denied access by the server device 50 (step S304: no), the information terminal device 100 informs the user of the denied access on the display screen 102 (step S310). The information terminal device 100 then stores the created confidential email as an unsent confidential email in the exclusive data area of the application B (step S312) and terminates the confidential email sending process of FIG. 20. When the exclusive data area has storage of any unsent confidential email, the number of unsent confidential emails is shown next to the label 'Create & Send Confidential Email' of the option button '1' in the confidential email option menu of FIG. 11.

In response to the permitted access to the secret address set on the server device 50 (step S304: yes), on the other hand, the faked confidential email is sent to the secret address (step S306). The receiver address of the confidential email is attached to the faked confidential email. After the successful transmission of the faked confidential email, the information terminal device 100 stores the confidential email as a sent confidential email in the exclusive data area of the application B (step S308) and terminates the confidential email sending process of FIG. 20. A press of the option button '3' in the confidential email option menu of FIG. 11 opens the confidential outbox to display a list of sent confidential emails on the display screen 102.

As mentioned above, all the faked confidential emails created by the sender information terminal device 100 are sent from the information terminal device 100 to its secret address set on the server device 50, irrespective of the receiver addresses of the confidential emails. The server device 50 receives each faked confidential email and transfers the faked confidential email to the attached receiver address of the confidential email.

Figure 21:
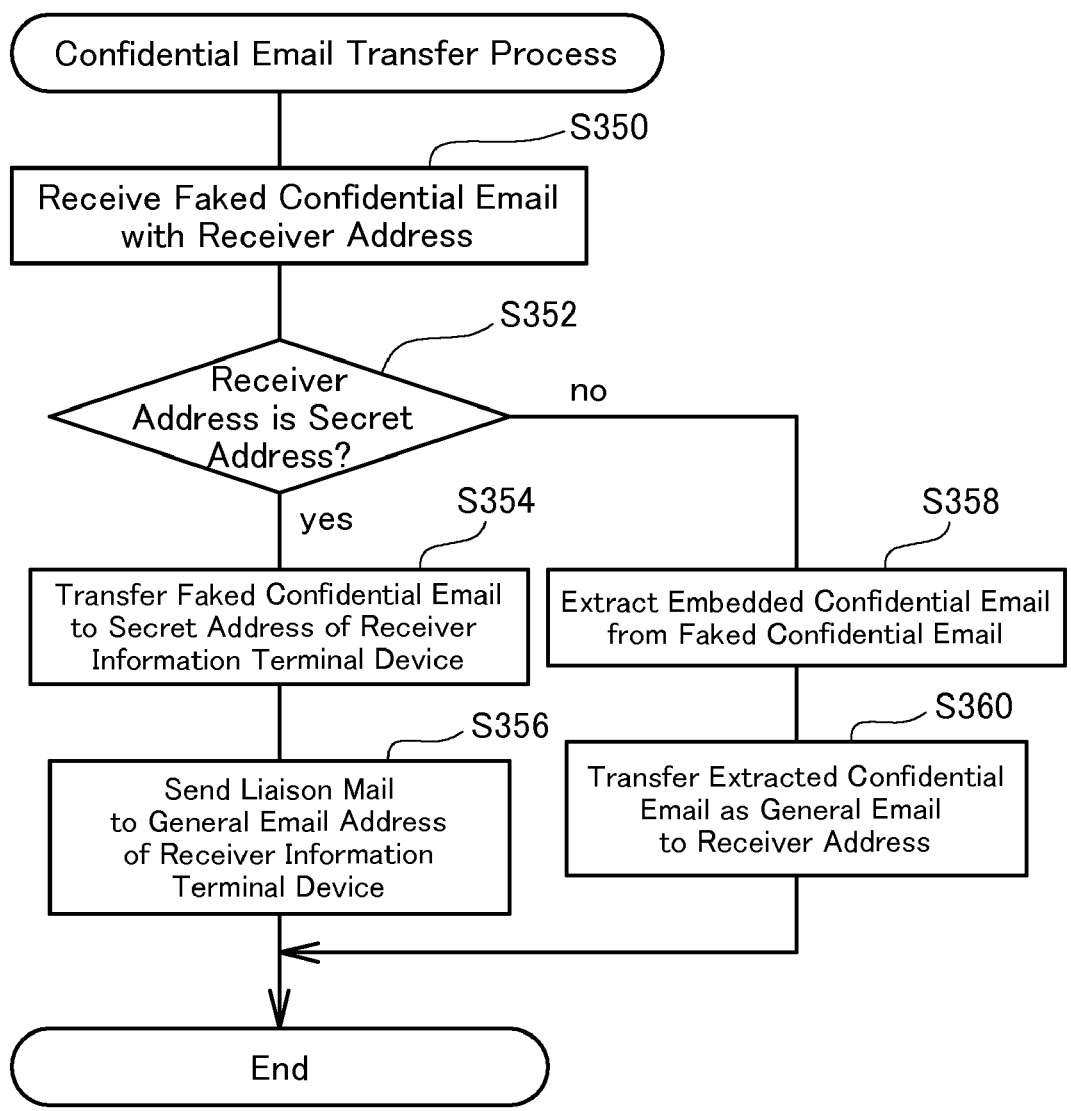
FIG. 21 is a flowchart showing a confidential email transfer process executed by the server device to transfer a faked confidential email, which is sent from a sender information terminal device to its secret address, to an attached receiver address of the confidential email.

FIG. 21 is a flowchart showing a confidential email transfer process executed by the server device 50 to transfer a faked confidential email, which is sent from the sender information terminal device 100 to its secret address, to an attached receiver address of the confidential email. On a start of the confidential email transfer process, the server device 50 first receives a faked confidential email with the attached receiver address of the confidential email and stores the faked confidential email at the secret address assigned to the application B of the sender information terminal device 100 (step S350).

The server device 50 subsequently identifies whether the receiver address attached to the faked confidential email is a secret address (step S352). As mentioned previously, at the time of installation of each application program in the information terminal device 100, a specific application ID is allocated to the installed application program and is registered in the server device 50. The server device 50 then issues a unique secret address corresponding to the registered application ID. The secret address is stored in correlation to the application ID in the server device 50. The server device 50 compares the receiver address attached to the faked confidential email with the stored secret addresses for matching and thus readily identifies whether the receiver address of the faked confidential email is a secret address.

When the receiver address is not a secret address (step S352: no), it is presumed that the receiver of the confidential email is an information terminal device 100 with no installation of the application B. If the application B is installed in the receiver information terminal device 100, a corresponding secret address is expected to be issued and stored in the server device 50 at the time of installation of the application B. The absence of the corresponding secret address in the storage of the server device 50 means that the application B is not installed in the receiver information terminal device 100. In this case, the receiver information terminal device 100 is not capable of extracting the confidential email from the faked confidential email. It is accordingly required to transfer the confidential email in the non-faked form. When the receiver address is a secret address (step S352: yes), on the other hand, it is presumed that the receiver of the confidential email is an information terminal device 100 with installation of the application B. In this case, the receiver information terminal device 100 is capable of extracting the confidential email from the faked confidential email. The confidential email is thus transferable in the faked form.

The server device 50 transfers the received confidential emails in two different forms based on the identification result of the receiver address as the secret address or the non-secret address. The following describes the details of the transfer process to a non-secret address (that is, a general email address) and the transfer process to a secret address.

E-2-1. Sending to General Email Address

Figure 22:
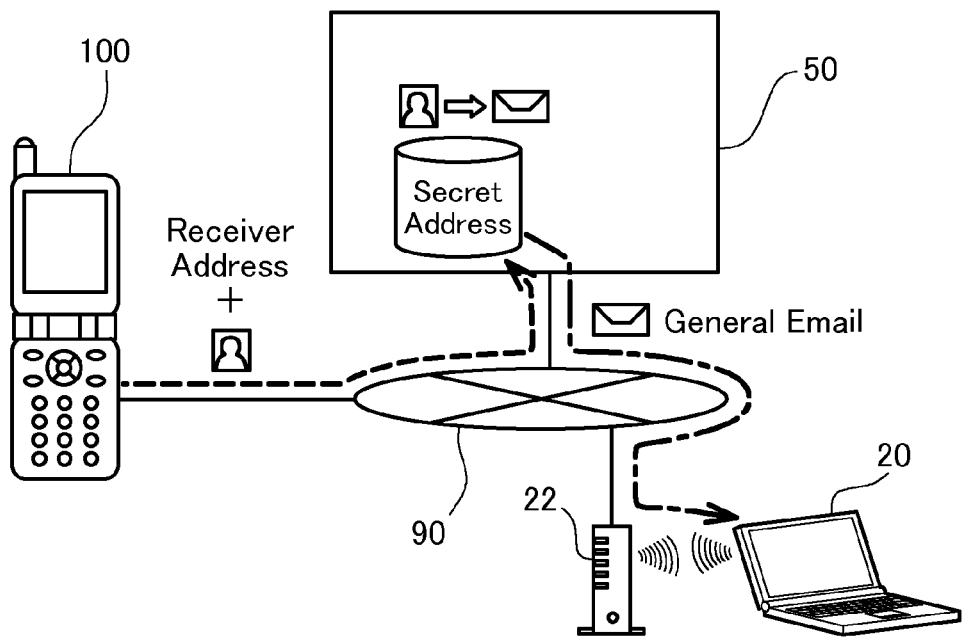
FIG. 22 conceptually shows transfer of a confidential email sent from a sender information terminal device to a general email address by the server device.

FIG. 22 conceptually shows transfer of a confidential email sent from the sender information terminal device 100 to a general email address by the server device 50. This is equivalent to the processing of steps S358 and S360 upon identification of the receiver address as a non-secret address at step S352 in the confidential email transfer process of FIG. 21. This transfer process is described with reference to the flowchart of FIG. 21 and the conceptual view of FIG. 22.

A faked confidential email is sent from the sender information terminal device 100 to its secret address set on the server device 50. The arrow of the broken line in FIG. 22 shows transmission of a confidential email faked to image data to the secret address assigned to the sender information terminal device 100. The server device 50 stores the received confidential email in the faked form at the secret address and identifies whether the receiver address attached to the received confidential email is a secret address (step S352 in FIG. 21). Upon identification of the receiver address as a non-secret address (step S352: no), the server drive 50 extracts the confidential email from the fake image data as the faked confidential email (step S358 in FIG. 21).

The application ID embedded with the confidential email in the image data is required for extraction of the confidential email from the faked confidential email as described previously. The server device 50 stores the correlation map of the secret address to the application ID when issuing each secret address. The server device 50 accordingly refers to the correlation map to obtain the application ID corresponding to the secret address and extracts the confidential email from the faked confidential email. The open arrow in the server device 50 of FIG. 22 shows extraction of the confidential email from the faked confidential email stored at the secret address assigned to the sender information terminal device 100.

The server device 50 then transfers the extracted confidential email in the form of a general email to the receiver address (step S360 in FIG. 21). The receiver information terminal device is expected to have no installation of the application B (application program for dealing with confidential emails). The confidential email is thus transferred in the form of a general email receivable by the receiver information terminal device. The arrow of the one-dot chain line in FIG. 22 shows transfer of the extracted confidential email in the form of a general email from the server device 50 to the receiver laptop 20. When the receiver address is identified as a secret address, on the other hand, the server device 50 executes the following series of processing.

E-2-2. Sending to Secret Address

Figure 23:
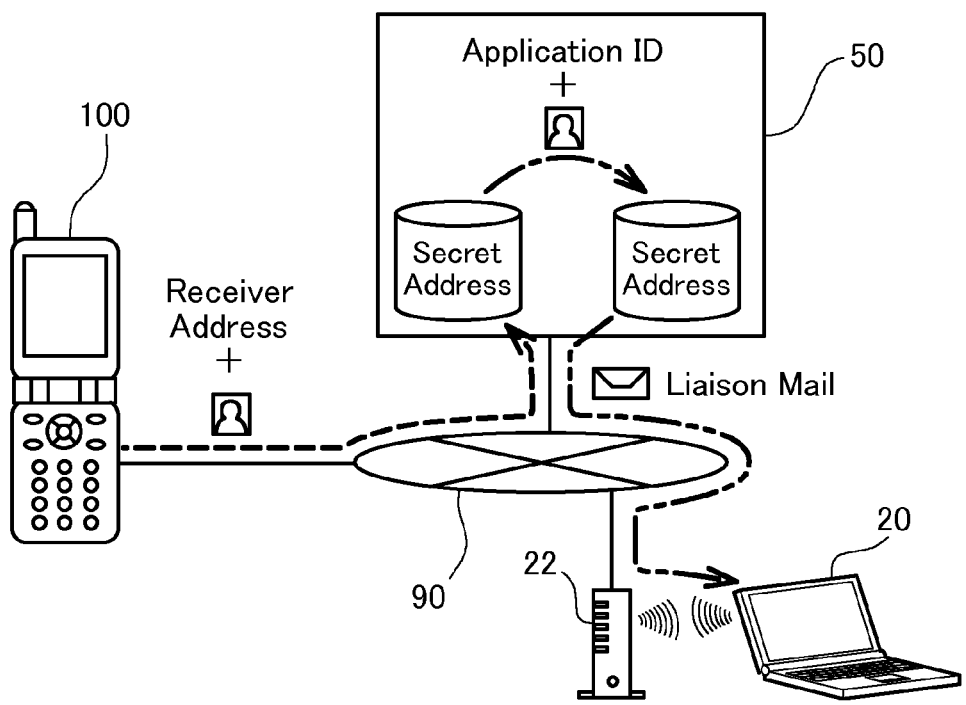
FIG. 23 conceptually shows transfer of a confidential email sent from a sender information terminal device to a secret address by the server device.

FIG. 23 conceptually shows transfer of a confidential email sent from the sender information terminal device 100 to a secret address by the server device 50. A faked confidential email is sent from the sender information terminal device 100 to its secret address set on the server device 50. The server device 50 temporarily stores the received faked confidential email at the secret address assigned to the application B of the sender information terminal device 100. The arrow of the broken line in FIG. 23 shows transmission of a faked confidential email to the secret address assigned to the sender information terminal device 100.

The server device 50 identifies whether the receiver address attached to the received faked confidential email is a secret address (step S352 in FIG. 21). Upon identification of the receiver address as a secret address (step S352: yes), the faked confidential email stored at the secret address assigned to the sender information terminal device 100 is transferred in the faked form to the identified secret address of the receiver information terminal device (step S354 in FIG. 21). Both the secret address of the sender information terminal device 100 and the secret address of the receiver information terminal device have been stored in the same server device 50. This transfer step thus simply shifts the storage location of the faked confidential email inside the server device 50.

The application ID of the sender information terminal device 100 is attached to the faked confidential email, which is transferred from the secret address of the sender information terminal device 100 to the secret address of the receiver information terminal device. In the structure of this embodiment, an application ID embedded together with a confidential email in image data is required for extraction of the confidential email from the faked confidential email. One application ID is allocated to each application program installed in one information terminal device 100. When a receiver information terminal device 100 receives only a faked confidential email prepared by a sender information terminal device 100, the receiver information terminal device 100 fails to extract the embedded confidential email from the faked confidential email, because of their different application IDs. The application ID assigned to the application B of the sender information terminal device 100 preparing the faked confidential email is thus stored with the faked confidential email. This causes the receiver information terminal device 100 to read the application ID simultaneously with the faked confidential email from the server device 50. The receiver information terminal device 100 uses the application ID read simultaneously with the faked confidential email from the server device 50 to extract the confidential email from the faked confidential email. The application ID of the sender information terminal device 100 used by the receiver information terminal device 100 for extraction of the confidential email from the faked confidential email is automatically deleted after the extraction.

Attachment of the application ID of the sender information terminal device 100 to the faked confidential email is not essential but may be replaced by another equivalent technique. In one possible modification, the sender information terminal device 100 embeds the secret address of the receiver information terminal device 100, in addition to the confidential email and the application ID, in image data to prepare a faked confidential email. The receiver information terminal device 100 is allowed to extract the confidential email from the faked confidential email in response to matching of either the application ID or the secret address.

When the receiver address of the received faked confidential email is identified as a secret address, the server device 50 transfers the confidential email in the faked form from the secret address of the sender information terminal device 100 to the identified secret address of the receiver information terminal device 100 (step S354 in FIG. 21). The server device 50 then sends a liaison mail to the general email address of the receiver information terminal device 100 (step S356). The liaison mail informs the user of the receiver information terminal device 100 of arrival of a confidential email as mentioned previously. Unlike the confidential email, the liaison email is automatically sent to the general email address of the receiver information terminal device 100 without any specific email receiving operation. The general email address for receiving the liaison mail is registered simultaneously with the application ID in the server device 50. The server device 50 sends the liaison mail to the registered general email address. The arrow of the two-dot chain line in FIG. 23 shows transmission of a liaison mail from the server device 50 to the general email address of the receiver information terminal device 100 (laptop 20). The receiver information terminal device 100 (laptop 20) receives the liaison mail and performs the confidential email receiving operations described above with reference to FIGS. 11 through 14 to receive a confidential email at the confidential inbox and open the confidential email on the display screen 102.

As described above, the user of the information terminal device 100 selects the option button '1' in the confidential email option menu (see FIG. 11) to create a new confidential email and activates the 'Send' button provided on the lower right corner of the display screen 102 (see FIG. 19). The newly created confidential email is converted to a faked confidential email by the information terminal device 100 and is sent to the secret address of the information terminal device 100 set on the server device 50. The server device 50 identifies whether the receiver address of the confidential email is a secret address or a non-secret address. When the receiver address is a non-secret address, the server device 50 extracts the confidential email from the faked confidential email and transfers the extracted confidential email in the form of a non-confidential email to the receiver information terminal device 100. When the receiver address is a secret address, on the other hand, the server device 50 sends the liaison mail, instead of the received faked confidential email, to the receiver information terminal device 100.

E-3. Process of Externally Storing Confidential Email

As shown in FIG. 12 or FIG. 16, when the user opens the confidential inbox, the list of received confidential emails is shown on the display screen 102. An 'External Storage' button is provided below the list. This button is used for external storage of confidential emails and is activated by a press of the center function select button 104b set on the main body of the information terminal device 100 (see FIG. 6). The function of externally storing confidential emails is described below.

As described previously, the confidential emails read by the information terminal device 100 are stored not in the common data area but in the exclusive data area under direct management of the relevant application program (see FIG. 3). Only the relevant application program managing the exclusive data area is generally allowed to read and write data from and into the exclusive data area. Neither any other application program nor the operating system is allowed to read and write data from and into the exclusive data area or is even notified of the presence of data in the exclusive data area.

The maximum memory capacity occupied by each application program in the application area has an upper limit as described previously with reference to FIG. 3. There are naturally a limited number of confidential emails storable in the exclusive data area. When the exclusive data area is fully occupied, it is required to delete some of the data stored in the exclusive data area or to transfer some of the stored data to the common data area or to an external storage medium like a memory card. The data transferred from the exclusive data area to the common data area or to the external storage medium are, however, accessible from other application programs and the operating system. Simple transfer of the confidential emails may thus cause undesirable leakage of the confidential data. The transferred confidential emails may be protected with a password or may be encoded prior to the storage. These techniques, however, can not prevent the third person from noticing the presence of confidential data, unlike the confidential data stored in the exclusive data area. The third person who somehow obtains the information terminal device 100 or the external storage device may break the password or the code to have illegal access to the confidential data. By taking into account such fears, the information terminal device 100 of the embodiment has the external storage function to transfer the confidential emails stored in the exclusive data area without the potential for leakage of the confidential data.

Figure 24:
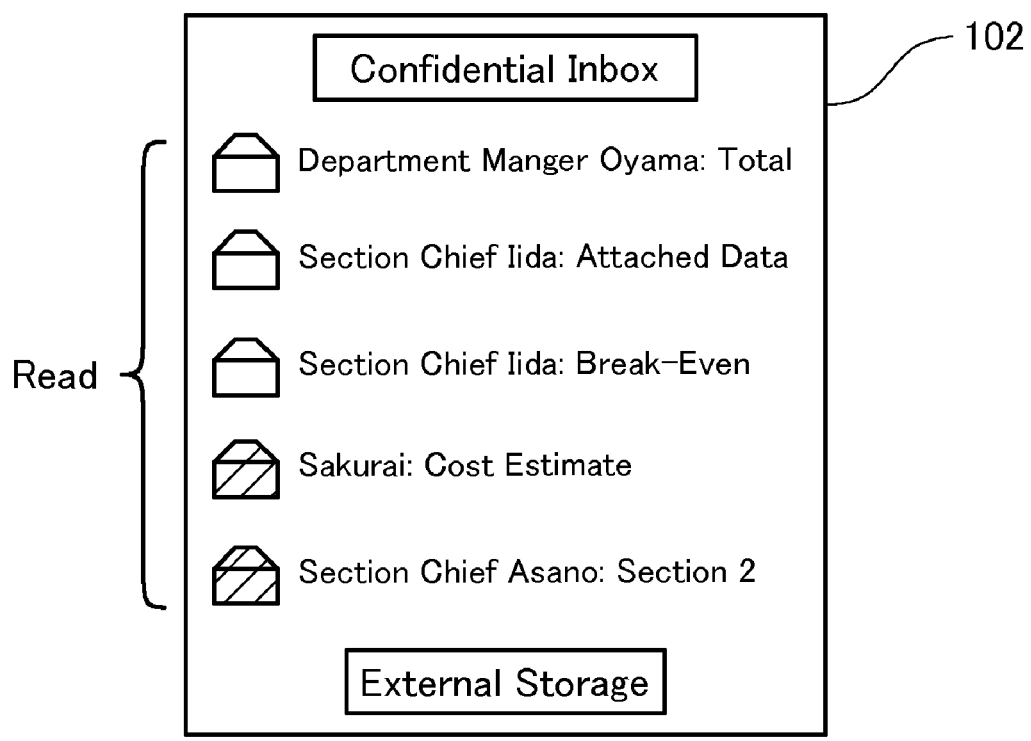
FIG. 24 shows a confidential inbox window opened on the display screen for external storage of confidential emails.

FIG. 24 shows the confidential inbox window opened on the display screen 102 for external storage of confidential emails. The user selects one or multiple confidential emails as the object of external storage in the list of confidential emails displayed by opening the confidential inbox. The object confidential emails are selected by operating the cursor buttons 104d and the select button 104e set on the main body of the information terminal device 100. In the illustrated example of FIG. 24, open envelop graphics filled with slant lines represent the selected confidential emails. After selection of the object confidential emails, a press of the center function select button 104b set on the main body of the information terminal device 100 starts a process of externally storing the selected confidential emails (confidential email external storage process).

Figure 25:
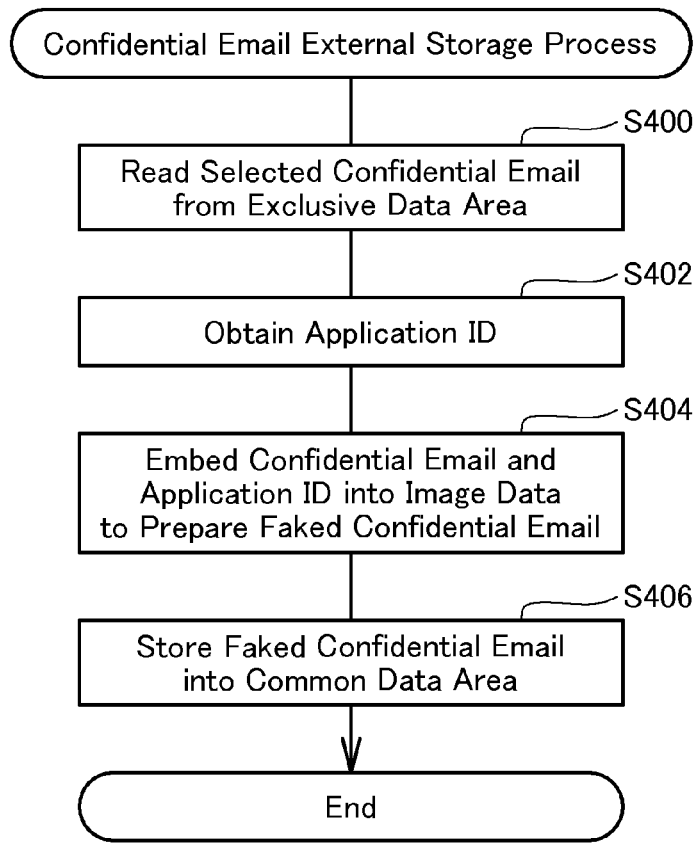
FIG. 25 is a flowchart showing a confidential email external storage process.

FIG. 25 is a flowchart showing the confidential email external storage process, which is executed by the application B (application program for dealing with confidential emails) in the information terminal device 100. On a start of the confidential email external storage process, the application B first reads a selected confidential email from the exclusive data area of the application B (step S400). When multiple confidential emails are selected, the application B reads all the selected confidential emails simultaneously. The application B then obtains the application ID allocated thereto (step S402). As explained above with reference to FIG. 3, the allocated application ID as well as the confidential emails are stored in the exclusive data area of the application B.

The application B embeds the selected confidential email and the application ID into fake image data to prepare a faked confidential email (step S404). The detailed procedure of preparing the faked confidential email has been described previously with reference to FIG. 18 and is thus not specifically mentioned here.

The faked confidential email is then stored into the common data area (step S406). The faked confidential email may otherwise be stored into an external storage medium, such as the memory card 112, by changing the storage destination. After such external storage of the faked confidential email, the application B terminates the confidential email external storage process of FIG. 25.

The confidential email external storage function of this embodiment fakes confidential emails read from the exclusive data area into image data (or sound data) for external storage. Any other application program or the operating system having access to the externally stored data accordingly does not notice the embedded confidential emails. This arrangement ensures safe and secure external storage of confidential emails without the potential for analysis and leakage of confidential data.

Figure 26:
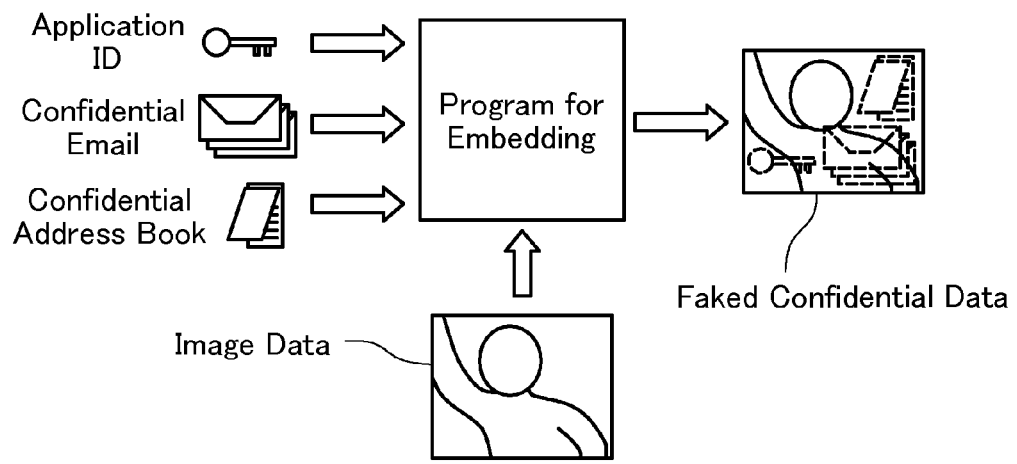
FIG. 26 conceptually shows a process of embedding confidential data including an application ID, confidential emails, and a confidential address book into image data for external storage as faked confidential data.

The confidential email external storage process of FIG. 25 embeds selected confidential emails into image data for external storage. The object of external storage is, however, not restricted to confidential emails, but may be other confidential data, for example, a confidential address book. FIG. 26 conceptually shows a process of embedding confidential data including an application ID, confidential emails, and a confidential address book into image data for external storage as faked confidential data. In the case of embedding plural pieces of confidential data (for example, confidential emails and a confidential address book), these confidential data may be set in a hierarchical structure or may be divided into multiple groups. In this case, the confidential data are embedded into image data with information on the hierarchical structure or with group identification information. When the object confidential data to be embedded has the excessive data volume relative to the data volume of fake image data (or sound data), the object confidential data may automatically be embedded as multiple divisions into multiple different image data. Otherwise an adequate alarm may be given on the display screen 102 to urge the user to divide the object confidential data into multiple divisions for multiple series of external storage.

E-4. Process of Transferring Confidential Data

As shown in FIG. 11, the function of transferring confidential data is assigned to the option button '5' of the confidential email option menu. This function enables confidential data (for example, confidential emails and a confidential address book) stored in an old information terminal device 100 to be transferred to a new information terminal device 100 via the server device 50 when the user replaces the old information terminal device 100 with the new information terminal device 100. The confidential data transfer function of this embodiment is activated to transfer confidential data stored in the information terminal device 100 to another information terminal device 100 as described below.

Figure 27:
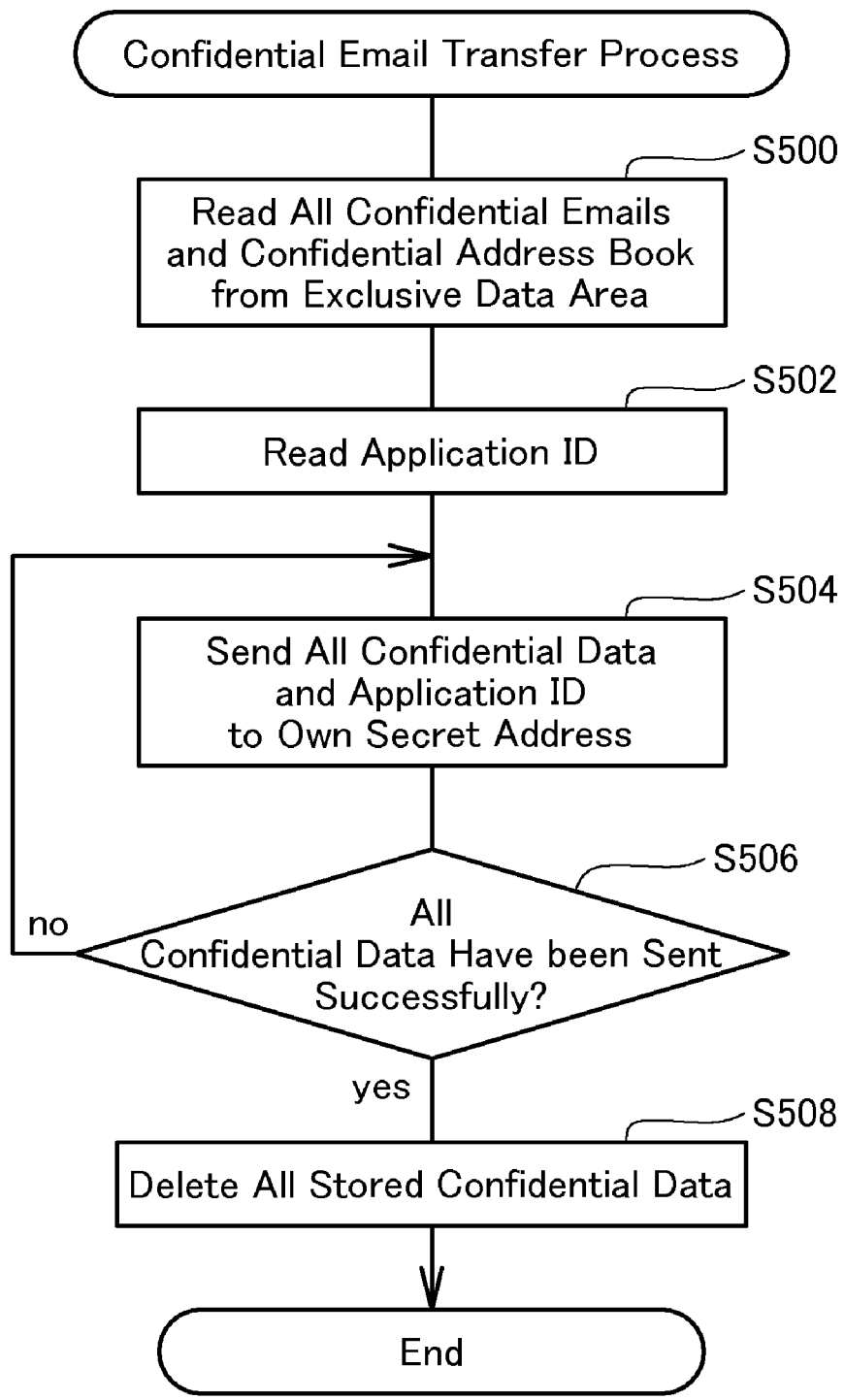
FIG. 27 is a flowchart showing a process of transferring confidential data stored in one information terminal device to another information terminal device.

FIG. 27 is a flowchart showing a process of transferring confidential data stored in the information terminal device 100 to another information terminal device. The application B installed in the information terminal device 100 executes this transfer process in response to a press of the option button '5' in the confidential email option menu shown in FIG. 11.

On a start of the confidential data transfer process, the application B reads all the confidential emails and the confidential address book stored in the exclusive data area (step S500). When the confidential emails are divided in multiple different folders to have a hierarchical structure, the information on the hierarchical structure is read out simultaneously. The description here regards the confidential data stored in the exclusive data area. The object of data transfer is, however, not such confidential data but may include faked confidential emails stored in the common data area.

The application B reads out the application ID stored in the exclusive data area (step S502) and sends the confidential data with the application ID to the own secret address assigned to the application B (step S504). In the confidential data transfer process, all the confidential data stored in the exclusive data area are the object of the data transfer and have an extremely large data volume. The procedure of this embodiment accordingly sends the confidential data in a non-faked form. The confidential data may otherwise be sent in a faked form or in a compressed form.

The application B then determines whether all the confidential data stored in the old information terminal device 100 have been sent successfully (step S506). In the event of failed transmission of all the confidential data (step S506: no), the application B tries the transmission of all the confidential data again (step S504). In the case of successful transmission of all the confidential data (step S506: yes), on the other hand, the application B deletes all the confidential data stored in the old information terminal device 100 (step S508) and terminates the confidential data transfer process of FIG. 27.

Figure 28:
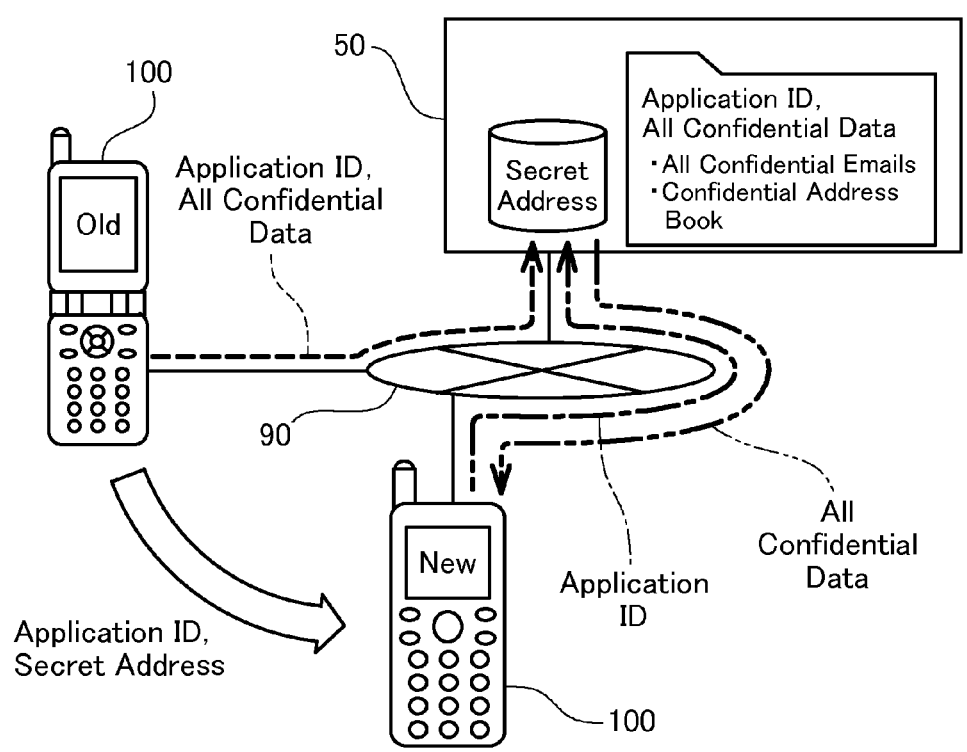
FIG. 28 conceptually shows transfer of confidential data stored in an old information terminal device to a new information terminal device by the confidential data transfer process.

FIG. 28 conceptually shows transfer of confidential data stored in an old information terminal device 100 to a new information terminal device 100 by the confidential data transfer function. In response to a press of the option button '5' 'Transfer Confidential Data' in the confidential email option menu, the application ID and all the confidential data stored in the old information terminal device 100 are sent to the secret address of the application B set on the server device 50. The arrow of the broken line in FIG. 28 shows transmission of the application ID and all the confidential data to the server device 50 for storage at the corresponding secret address set on the server device 50. The process then reads the application ID and the secret address of the application B stored in the old information terminal device 100 and sets the application ID and the secret address of the application B in the new information terminal device 100. This step may be performed manually on the display screen 102 by the user. The settings of the application ID and the secret address may be transferred through communication made between the old information terminal device 100 and the new information terminal device 100.

After receiving the settings of the application ID and the secret address of the application B, the new information terminal device 100 sends the application ID to make access to the corresponding secret address set on the server device 50. The arrow of the one-dot chain line in FIG. 28 conceptually shows transmission of the application ID from the new information terminal device 100 to make access to the corresponding secret address set on the server device 50. The application ID sent from the new information terminal device 100 is identical with the application ID used in the old information terminal device 100. The new information terminal device 100 is thus permitted to make access to the corresponding secret address set on the server device 50. On the permitted access, all the confidential data stored at the secret address are downloaded to the new information terminal device 100. The arrow of the two-dot chain line in FIG. 28 conceptually shows download of all the confidential data from the secret address set on the server device 50.

The confidential data transfer function is used to transfer confidential data stored in the old information terminal device 100 to the new information terminal device 100. When the confidential emails are dividedly stored in multiple folders in the old information terminal device 100, the confidential emails with the information on the divided storage are transferable to the new information terminal device 100. The confidential email transfer process of this embodiment automatically deletes the confidential data stored in the old information terminal device after successful transmission of all the confidential data to the secret address set on the server device 50. This arrangement desirably prevents the potential leakage of confidential data from the old information terminal device 100.

F. Modifications

The information terminal device 100 of the embodiment may have various modifications. Some examples of possible modification are described briefly.

F-1. First Modified Example

In the structure of the embodiment, irrespective of the current operating status of the information terminal device 100, when the button key driver 124 detects the user's manipulation of the series of operation buttons 104 in the preset order, the detection is transmitted to the operating system. The operating system then interrupts the current operation to activate the application program (application B) for attaining the confidential email function. In one possible modification, the application B may be activated to enable the confidential email function only in response to the user's button operations in the preset order during execution of a different application program irrelevant to the email function (for example, an application program for attaining a game function or a scheduling function).

Figure 29:
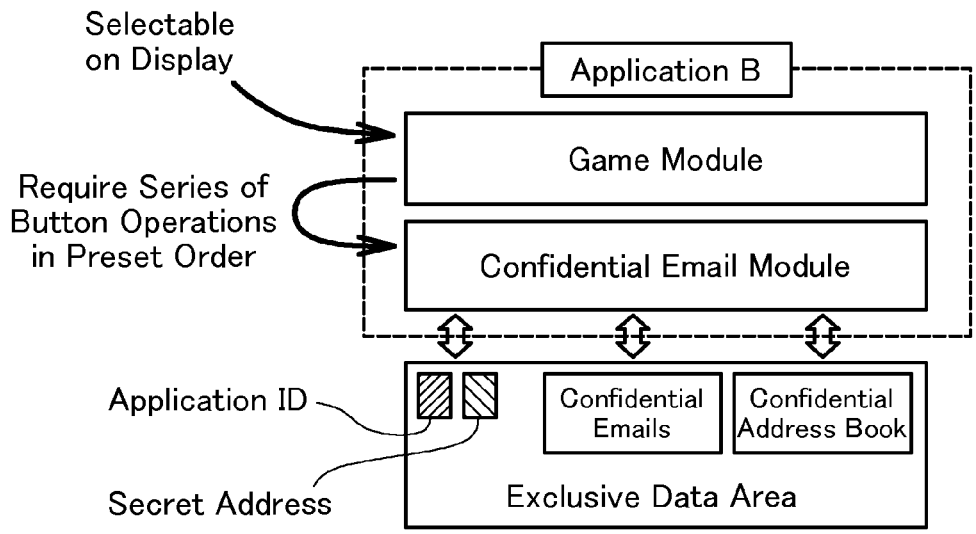
FIG. 29 shows the general structure of an application program for attaining the confidential email function in a first modified example.

FIG. 29 shows the general structure of an application program (application B) for attaining the confidential email function in a first modified example. As illustrated, the application B of the first modified example mainly has two modules, a module for the confidential email function (confidential email module) and a module for an different function (for example, game function) irrelevant to the confidential emails (game module). The modules here represent classified functions of the application program. While the game module may be activated by selection of a game option on the display screen 102, the confidential email module is activated only by the user's manipulation of series of operation buttons 104 in a preset order during activation of the game module. Only the confidential email module is accessible to the confidential emails, the confidential address book, the application ID, and the secret address stored in the exclusive data area of the application B. Even the presence of such data is concealed to the game module. Installation of this application B in the information terminal device 100 is apparently regarded as installation of only the game module. Namely installation of the confidential email module is concealed.

Figure 30:
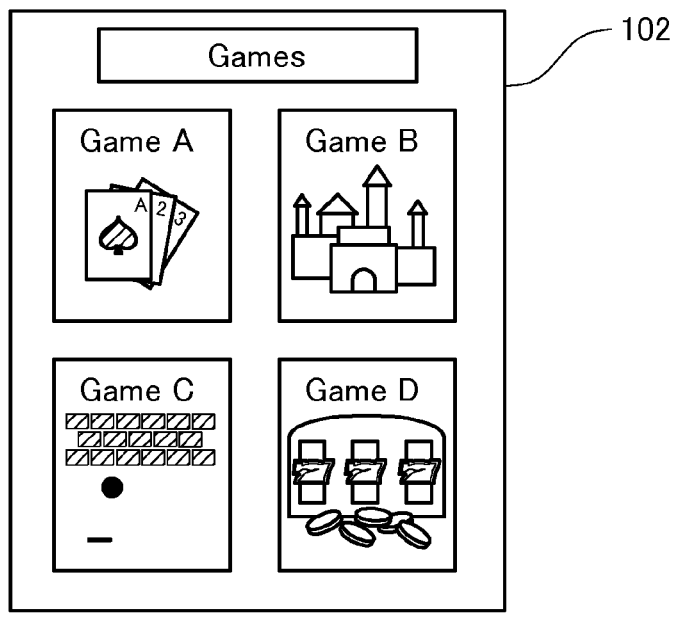
FIG. 30 shows a game function installed simultaneously with a confidential email module and displayed on the display screen in a selectable manner.

FIG. 30 shows a game function installed simultaneously with the confidential email module and displayed on the display screen 102 in a selectable manner. A game option window is opened on the display screen 102 in response to selection of the option 'Games' in the option menu of FIG. 5. In the illustrated example of FIG. 30, four games A through D are provided as possible game options in a selectable manner. One of these four game functions is installed simultaneously with the confidential email module. When the user operates the cursor buttons 104d to shift the cursor to a desired game on the display screen 102 and presses the select button 104e, the selected game function is activated to enable the user to play the corresponding game like the other conventional games.

In the first modified example, installation of the application B in the information terminal device 100 automatically causes simultaneous installation of the confidential email module and the module for the different function irrelevant to the confidential email function (game module). Installation of the application B is, however, apparently regarded as installation of only the simple game function on the display screen 102. Selection of this specific game function with the confidential email function on the display screen 102 enables the user to play the corresponding game, like the other conventional games. This arrangement effectively prevents any third person from realizing the concealed confidential email function simultaneously installed with the game function. In this illustrated example, the game A corresponds to the game function installed with the confidential email function. Activation of the confidential email function requires the series of button operations in the preset order during activation of the game A selected on the game option window of FIG. 30. The required button operations activate the confidential email function to open the confidential email option menu of FIG. 11.

It is completely unimaginable to activate the different function irrelevant to the email function (the game function in this example) for the purpose of enabling the confidential email function. Even if the information terminal device 100 is lost or stolen, this arrangement effectively prevents any third person from noticing the concealed confidential email-related function of the information terminal device 100. The buttons used for playing the game are generally limited to, for example, the cursor buttons 104d and the select button 104e and do not include the entry buttons 104h. The concealed confidential email function is activated in response to the user's manipulation of the series of operation buttons 104, which are generally unused for the game, in the preset order, for example, '*5#0'. This arrangement desirably prevents the third person from accidentally activating the confidential email function.

In the first modified example, installation of the application B for attaining the confidential email function causes simultaneous installation of the confidential email module and the game module of the game A. The module simultaneously installed with the confidential email module is, however, not restricted to the game module of the game A but may be any game module. For example, four separate game modules may be provided for the four different games shown in FIG. 30. The confidential email module may be installed simultaneously with any one of these four game modules into the information terminal device 100. Only the user involved in module installation can identify the game module installed simultaneously with the confidential email module among the four games displayed on the display screen 102 in the selectable manner. Such modification further increases the difficulty in accidental activation of the confidential email function by any third person and thus ensures the effective concealment of the presence of confidential emails.

F-2. Second Modified Example

In the information terminal device 100 of the embodiment, the confidential email option menu is opened on the display screen 102 only when the user operates the series of operation buttons in the preset order. The presence of confidential emails is concealed to other application programs and browsers. Even if the information terminal device 100 is accidentally or illegally transferred to the third person, this arrangement effectively prevents leakage of the stored confidential data. When the information terminal device 100 is lost or stolen, however, there is still some potential, although very low, for leakage of the stored information. One favorable application thus requires an access to the server device 50 for activation of the information terminal device 100 (or for activation of the specific game function linked with the confidential email function as in the first modified example). Activation of the information terminal device 100 or the specific game function is allowed only after acquisition of the setting in the server device 50. When the information terminal device 100 is lost or stolen, the incident is set in advance in the server device 50. This modified arrangement more effectively prevents leakage of the stored confidential data. Such modification in combination with activation of the confidential email function during execution of a specific game function is described below as a second modified example.

Figure 31:
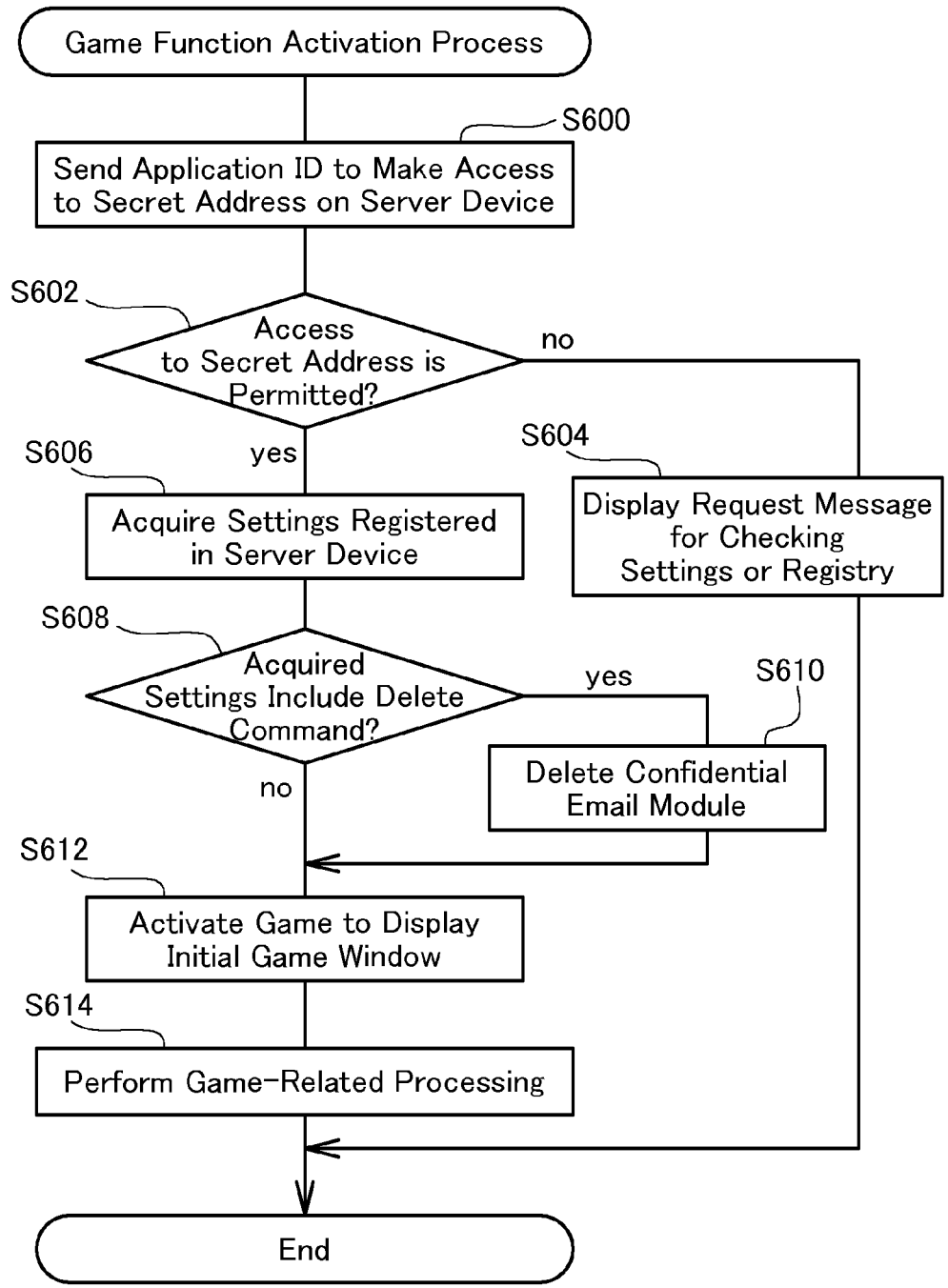
FIG. 31 is a flowchart showing a game function activation process executed by the information terminal device in a second modified example.

FIG. 31 is a flowchart showing a game function activation process executed by the information terminal device 100 in the second modified example. In response to selection of the specific game function (game A) installed simultaneously with the confidential email function on the game option window of FIG. 30, the application B stored in the application area is read by the operating system to be activated.

On a start of the game function activation process, the application B of the second modified example first reads the application ID and the secret address stored in its exclusive data area and sends the application ID to make access to the secret address set on the server device 50 (step S600). The application B then identifies permission or denial of the access to the secret address (step S602). The access is permitted when the application B sends the accurate application ID and makes access to the valid secret address. When some use fee is set to the application B, payment of the use fee is one of the conditions for the permitted access. In the event of the denied access (step S602: no), the application B shows a request message on the display screen 102 for checking the settings in the information terminal device 100 or the registry in the server device 50 (step S604) and immediately terminates the game function activation process of FIG. 31 without activating a selected specific game function.

In the case of the permitted access to the secret address (step S602: yes), on the other hand, the application B acquires the settings registered in the server device 50 (step S606). In the structure of the second modified example, the settings relating to the confidential email function are registered in advance in the server device 50. The registry of such settings may be performed on the confidential email option menu of the information terminal device 100. On condition that required pieces of information including the application ID and the secret address are known, the settings may be registered from another information terminal device 100. In the second modified example, the settings registered at each secret address include a setting to enable or disable forcible deletion of the confidential email function. At step S616 in the game function activation process of FIG. 31, the application B gains access to the secret address set on the server device 50 to read the settings registered in the server device 50, prior to activation of the selected game function.

It is then determined whether the settings registered in the server device 50 include a command of deleting the confidential email function (deletion command) (step S608). When the deletion command is not included in the settings (step S606: no), the selected game function is activated to display an initial game window on the display screen 102 (step S612) and perform a required series of game-related processing in response to the user's button operations (step S614).

Figure 32:
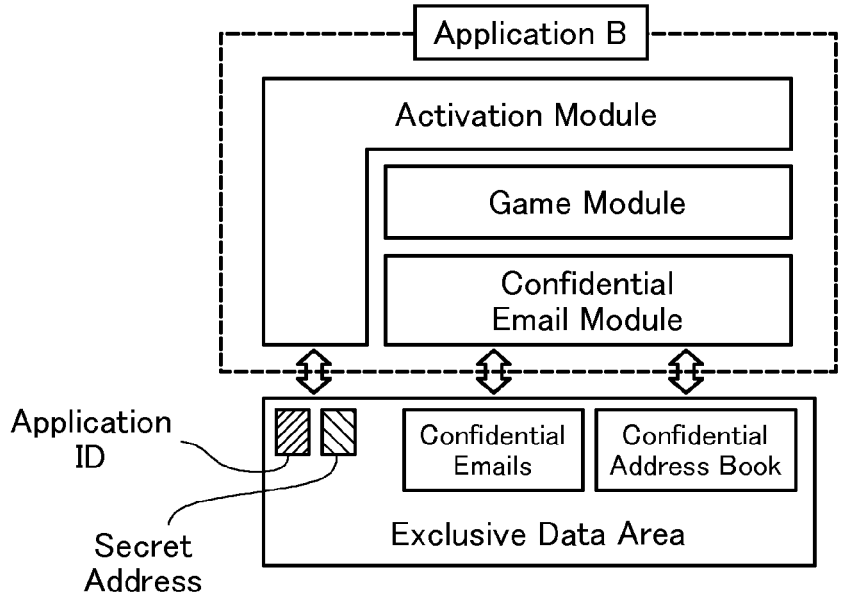
FIG. 32 shows multiple modules included in an application program in the second modified example.

FIG. 32 shows the module structure of the application B in the second modified example. As illustrated, the application B of the second modified example mainly includes three modules 'activation module', 'game module', and 'confidential email module'. The 'activation module' is read and executed first in response to selection of the option 'Game A' on the game option window of FIG. 30. The game function activation process of FIG. 31 is executed by a program included in the activation module.

The 'game module' is activated to execute the specific game A selected on the game option window of FIG. 30. The 'confidential email module' is activated to enable the confidential email function described above.

FIG. 32 also shows accessible ranges in the exclusive data area accessible from the respective modules. As illustrated, the application ID and the secret address are accessible from the activation module, while the confidential emails and the confidential address book are accessible only from the confidential email module. The confidential email module is obviously allowed to make access to the application ID and the secret address.

In the information terminal device 100 of the second modified example, when the settings registered in the server device 50 do not include the deletion command (step S608: no), the game function activation process of FIG. 31 reads the 'game module' to activate the selected game (game A) at step S612. The series of button operations in the preset order during execution of the selected game activates the 'confidential email module' to enable the confidential email function.

When the settings registered in the server device 50 include the deletion command (step S608: yes), on the other hand, the game function activation process deletes the 'confidential email module' from the application area (step S610). The deletion process may delete only the confidential email module or may delete the confidential data simultaneously with the confidential email module. One possible modification may lock the confidential email function to be inactive even by the series of button operations in the preset order, instead of deleting the confidential email module.

The selected game function is then activated to display the initial game window on the display screen 102 (step S612) and perform the required series of game-related processing in response to the user's button operations (step S614). Since the confidential email module has been deleted, the series of button operations in the preset order during execution of the selected game does not activate the confidential email function. The game function activation process of FIG. 31 is terminated when the user stops the game.

When the information terminal device 100 is lost or stolen, the user uses another information terminal device 100 to make access to the secret address on the server device 50 and set a deletion command. This arrangement of the second modified example effectively prevents leakage of the confidential data stored in the lost or stolen information terminal device 100.

Figure 33:
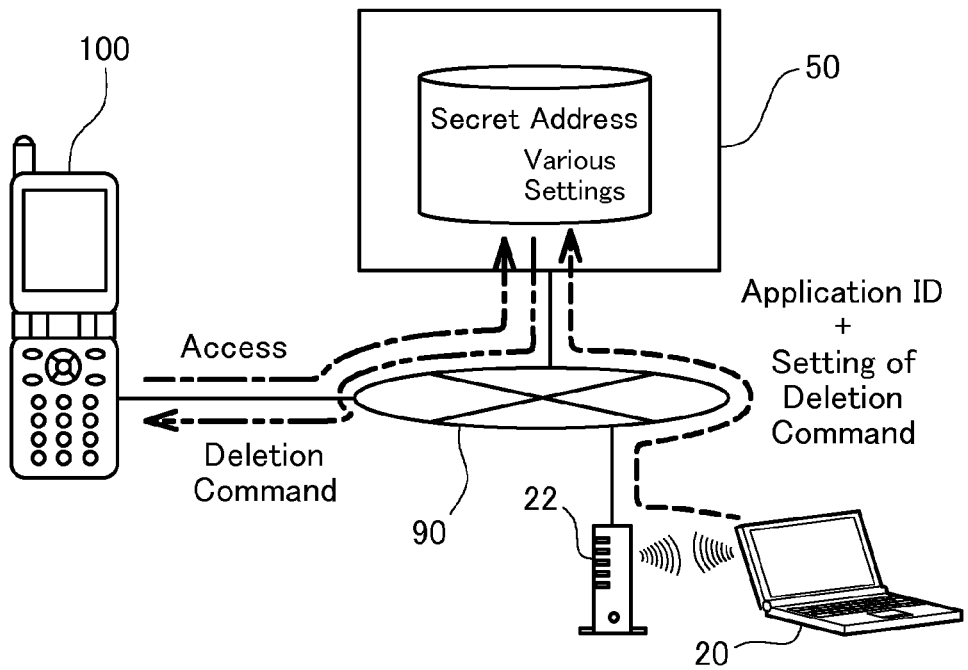
FIG. 33 shows the principle of preventing leakage of confidential data in the second modified example.

FIG. 33 shows the principle of effectively preventing leakage of confidential data in the second modified example. When the information terminal device 100 is lost or stolen, another information terminal device 100 (laptop 20 in the illustrated example) is used to make access to the secret address on the server device 50 and set a deletion command. As mentioned above, on condition that the required pieces of information including the application ID and the secret address are known, another information terminal device 100 is usable to make access to the secret address on the server device 50 and set a deletion command at the secret address. The arrow of the broken line in FIG. 33 shows setting of the deletion command.

When the third person picking up (or stealing) the information terminal device 100 tries to activate the specific game function (game A) installed simultaneously with the confidential email function, the information terminal device 100 automatically makes access to the server device 50 to read the settings registered at the secret address on the server device 50. The arrow of the one-dot chain line in FIG. 33 shows an access of the information terminal device 100 to the server device 50. The arrow of the two-dot chain line in FIG. 33 shows acquisition of the settings registered in the server device 50. The acquired settings include a deletion command, so that the confidential email module is deleted from the application B installed in the lost or stolen information terminal device 100. After deletion of the confidential email module, the confidential email function is obviously not activated even by the series of button operations in the preset order during execution of the game A. This arrangement effectively prevents leakage of confidential data. Deletion of confidential data simultaneously with the confidential email module decreases the possibility of leakage of the confidential data to zero. The lost or stolen information terminal device 100 may be returned to the legal user. In such cases, if the confidential data are not deleted but are kept in the information terminal device 100, simple reinstallation of the confidential email module enables the legal user to readily read the confidential data from the storage of the information terminal device 100 again.

In the second modified example, the information terminal device 100 gains access to the server device 50 to check the presence of a deletion command, prior to activation of the specific game function (game A) installed simultaneously with the confidential email function. The information terminal device 100 may alternatively be designed to gain access to the server device 50 and check the presence of a deletion command at the time of power supply.

F-3. Third Modified Example

In the embodiment described above, all the incoming confidential emails are stored in the exclusive data area of the relevant application program. The contents of each confidential email selected from the open confidential inbox are displayable on the display screen 102 at any desired time. In one possible modification as a third modified example, an attribute on an allowable number of times of display may be added to each confidential email in the process of its creation. When the number of times of displaying each incoming confidential email on the display screen 102 reaches the allowable number of times, the incoming confidential email is deleted.

Figure 34:
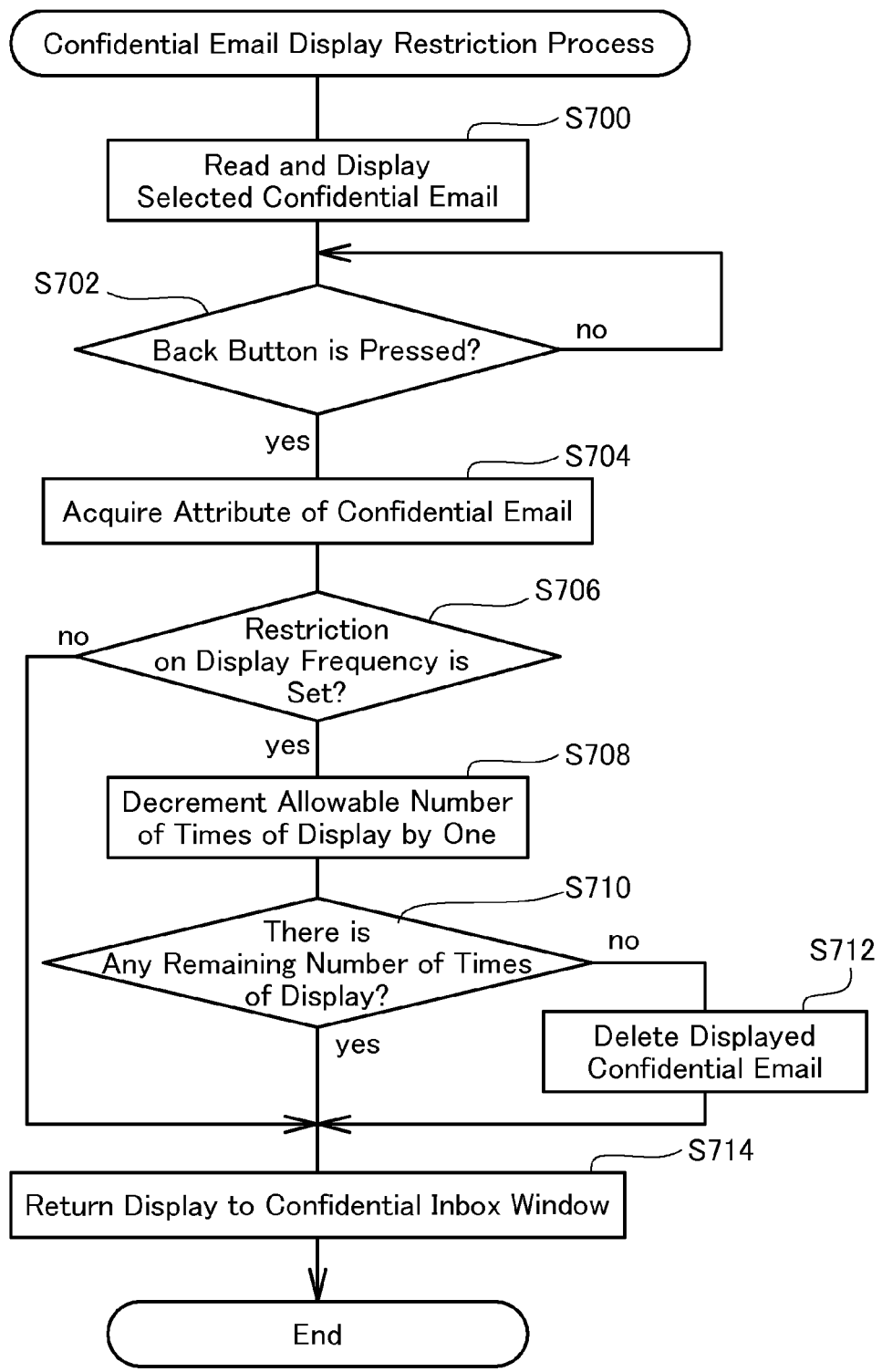
FIG. 34 is a flowchart showing a confidential email display restriction process executed by the information terminal device in a third modified example.

FIG. 34 is a flowchart showing a process of restricting the display frequency of each confidential email (confidential email display restriction process) by the information terminal device 100 in the third modified example. The application B starts this confidential email display restriction process when the user opens the confidential inbox in the confidential email option menu of FIG. 11 and selects a desired confidential email.

On a start of the confidential email display restriction process, the application B first reads a confidential email selected from the confidential inbox and displays the contents of the selected confidential email on the display screen 102 (step S700). The application B then determines whether a back button is pressed (step S702). The leftward cursor button 104*d* is assigned as the back button and is operated to return the display on the display screen 102 to the previous state. Selection of a desired confidential email on a confidential inbox window showing a list of confidential emails opens a confidential email contents window displaying the contents of the selected confidential email. A press of the back button during display of the confidential email contents window (step S702: yes) thus represents a command of closing the confidential email contents window. Under the condition of no press of the back button (step S702: no), the confidential email contents window is kept open.

In response to a press of the back button (step S702: yes), the application B does not immediately change the display but acquires an attribute of the displayed confidential email (step S704). In the third modified example, a preset attribute is written in the header of each confidential email in the process of its creation. The attribute specifies restriction or non-restriction on the display frequency and an allowable number of times of display in the case of restriction. At step S704, the attribute of the confidential email displayed on the display screen 102 is read from its header.

It is then determined whether the restriction on the display frequency is set in the displayed confidential email (step S706). Since the attribute of the confidential email has been acquired already, the status of restriction on the display frequency is immediately determinable. In the case of no restriction on the display frequency (step S706: no), the application B changes the display on the display screen 102 to the confidential inbox window to show the list of confidential emails (step S714) and terminates the confidential email display restriction process of FIG. 34.

When the restriction on the display frequency is set in the displayed confidential email (step S706: yes), on the other hand, the application B decrements the allowable number of times of display set in the header of the displayed confidential email by one (step S708) and identifies whether there is any remaining number of times of display, that is, whether the allowable number of times of display reaches zero (step S710). When there is still a remaining number of times of display (step S710: yes), the application B changes the display on the display screen 102 to the confidential inbox window to show the list of confidential emails (step S714).

When there is no remaining number of times of display (step S710: no), on the other hand, the application B deletes the confidential email displayed on the display screen 102 from the exclusive data area (step S712) and changes the display on the display screen 102 to the confidential inbox window to show the list of confidential emails (step S714). On this occasion, since the confidential email displayed on the display screen 102 has already been deleted from the exclusive data area, the list of confidential emails stored in the confidential inbox does not include the deleted confidential email.

As described above, the third modified example sets the allowable number of times of displaying each confidential email according to the confidentiality level of information included in the confidential email. This arrangement effectively prevents leakage of important confidential data. For example, the allowable number of times of display may be set to only once in a confidential email including information of the extremely high confidentiality. Such a confidential email is immediately deleted after display of its contents on the display screen 102 only once. There is accordingly no fear of leaking the information of the extremely high confidentiality. A larger value is set to the allowable number of times of display in a confidential email including information of the lower confidentiality. This ensures adequate protection of confidential data.

In the third modified example, the attribute attached to each confidential email specifies restriction or non-restriction on the display frequency and the allowable number of times of display. This attribute controls the display and deletion of the confidential email. The attribute attached to each confidential email is, however, not restricted to such settings but may be, for example, permission or prohibition of transfer of the confidential email or permission or prohibition of external storage of the confidential email. The prohibition of the transfer and the external storage may be set as the attribute to a confidential email including information of the high confidentiality. Setting this attribute more effectively prevents leakage of data of the high confidentiality. The restriction on the display frequency may be replaced by an allowable display time period (for example, within 24 hours after transmission of the confidential email) or an allowable display term (for example, within the current accounting term).

The transmission status of the liaison mail may be added as the attribute to each confidential email. For example, an attribute specifying no transmission of the liaison mail may be added to a confidential email including information of no urgency but of high confidentiality. This arrangement eliminates even he hint for the confidential email and thus completely conceals the presence of the confidential email to any third person. A desired time zone for transmission of the liaison mail may be added as the attribute to each confidential email. This arrangement desirably prevents the third person from noticing the presence of the confidential email, due to ill-times transmission of the liaison mail.

F-4. Fourth Modified Example

In the embodiment described above, unlike the general emails, the confidential emails are not automatically sent from the server device 50 but require the specific series of mail-receiving operations in the information terminal device 100. In one possible modification as a fourth modified example, like the general emails, the confidential emails may not require any specific mail-receiving operations but may be sent automatically from the server device 50. The information terminal device 100 of this fourth modified example stores all the incoming general emails in the inbox of the general email option menu, while storing all the incoming confidential emails in the confidential inbox of the confidential email option menu. The confidential email option menu is opened only by the series of button operations in the preset order. The user may not immediately realize the presence of any unread confidential email in the confidential inbox. In the structure of the fourth modified example, a liaison mail is simultaneously sent with each confidential email from the server device 50 to the information terminal device 100. As explained previously, the incoming liaison mail is stored in the inbox of the general email option menu. The user can thus check the liaison mail immediately to be informed of arrival of a confidential email.

F-5. Fifth Modified Example

In the embodiment described above, the confidential emails sent from the server device 50 are stored in the information terminal device 100. Each confidential email is read from the storage in the information terminal device 100 and is displayed on the display screen 102 according to the requirements. In one possible modification as a fifth modified example, like the conventional Web mails, the information terminal device 100 may make access to the server device 50 to read a desired confidential email and display the confidential email on the display screen 102 according to the requirements. In this modified structure, the information terminal device 100 makes access to the secret address on the server device 50 to open a confidential inbox set in the server device 50 and display a list of confidential emails stored in the confidential inbox on the display screen 102. In response to the user's selection of a desired confidential email in the list displayed on the display screen 102, the information terminal device 100 makes access again to the secret address on the server device 50 to read the selected confidential email and display the contents of the selected confidential email on the screen display 102. In this arrangement, no confidential emails are stored in the information terminal device 100. Even if the information terminal device 100 is lost or stolen, there is no possibility of leakage of confidential data from the lost or stolen information terminal device 100.

F-6. Sixth Modified Example

The application program for enabling the confidential email function (application B in the description) may be downloaded from the server device 50 via the Internet 90 to be installed in the information terminal device 100. Here the application program may include the module for the confidential email function and the module for the different function irrelevant to confidential emails (for example, the game function) as described above in the first modified example of FIG. 29 or in the second modified example of FIG. 32. In one possible modification as a sixth modified example, after the application program for enabling the confidential email function is installed in the information terminal device 100, only the module for the different function irrelevant to confidential emails (for example, the game function) is downloaded again to be replaced with a module for another function. When the user is tired of the specific game function (game A in the modified examples described above) installed simultaneously with the confidential email function, only the game module is replaceable with a different game module.

The replaceable design of the different function module (for example, the game module) installed simultaneously with the confidential email module also has the following advantages and effects. Activation of the confidential email function requires the series of button operations in the preset order during execution of the specific game function as described previously. If one fixed game function is assigned for activation of the confidential email function, the third person who has experience of installing the confidential email function in the own information terminal device 100 may suspect installation of the confidential email function with the fixed game function. The replaceable design of the game module assigned for activation of the confidential email function, however, enables only the legal user of the information terminal device 100 to identify the game function assigned for activation of the confidential email function. This arrangement desirably avoids the third person's suspicion about installation of the confidential email function because of the presence of the fixed game function and thus more effectively prevents the third person from noticing installation of the confidential email function in the information terminal device 100.

The embodiment and its modified examples discussed above are to be considered in all aspects as illustrative and not restrictive. It will be apparent to those skilled in the art that the same may be modified, changed, varied, and altered in various ways without departing from the spirit and scope of the invention. Any and all such modifications within the meaning and range of equivalency of the claims are intended to be embraced therein. The scope and spirit of the present invention are indicated by the appended claims, rather than by the foregoing description.

What is claimed is:

1. An information terminal device that reads character data including at least a character string from a server device on a communication line and displays the character data on a display screen, said information terminal device comprising:

an option menu display module that displays on the display screen an option menu, which includes multiple options corresponding to multiple functions installed in said information terminal device in a selectable manner;

a general data display module that is activated by selection of a corresponding option in the option menu to enable a first function, which displays non-confidential character data as general data on the display screen in a selectable manner and, in response to selection of one of the displayed general data, displays content of the selected general data;

an operation unit that is operated to select one of the multiple options included in the option menu to activate a corresponding one of the multiple functions;

an operation detection module that detects operation of the operation unit; and a confidential data display module that is not included as one option in the option menu but is activated by a specific series of operations of the operation unit in a preset order to enable a second function, which displays confidential character data as confidential data on the display screen in a selectable manner and, in response to selection of one of the displayed confidential data, displays content of the selected confidential data, wherein the operation detection module detects the specific series of operations of the operation unit in the preset order without displaying an operation-related window on the display screen.

2. An information terminal device in accordance with claim 1, wherein the option menu display module displays the option menu that includes a selectable option corresponding to a third function, in addition to the option corresponding to the first function, and the confidential data display module enables the second function in response to the specific series of operations of the operation unit in the preset order during execution of the third function.

3. A character data display method that reads character data including at least a character string from a server device on a communication line and displays the character data, said character data display method comprising the steps of:

(A) displaying an option menu, which includes multiple options corresponding to multiple functions in a selectable manner;

(B) detecting an operation of an operation unit that is provided for selecting one of the multiple options included in the option menu to activate a corresponding one of the multiple functions;

(C) enabling a first function that is activated by selection of a corresponding option in the option menu, to display non-confidential character data as general data in a selectable manner and, in response to selection of one of the displayed general data, to display content of the selected general data;

(D) enabling a second function that is not included as one option in the option menu but is activated by a specific series of operations of the operation unit in a preset order, to display confidential character data as confidential data in a selectable manner and, in response to selection of one of the displayed confidential data, to display content of the selected confidential data, wherein said step (B) detects the specific series of operations of the operation unit in the preset order without displaying an operation-related window.

4. A character data display method in accordance with claim 3, wherein said step (A) displays the option menu that includes a selectable option corresponding to a third function, in addition to the option corresponding to the first function, and said step (D) enables the second function in response to the specific series of operations of the operation unit in the preset order during execution of the third function.

5. A character data display method in accordance with claim 3, wherein said step (D) displays the confidential data on the display screen in a selectable manner in response to entry of a predetermined password through operation of multiple operation buttons set on the operation unit for entry of characters, and said step (B) detects entry of the predetermined password without displaying a password entry window on the display screen.

6. A character data display method in accordance with claim 3, wherein said step (D) comprises the sub-steps of:
- (D-1) embedding the content of the confidential data in specific data to prepare faked confidential data as fake specific data; and
- (D-2) storing the faked confidential data in a readable form.

7. A character data display method in accordance with claim 3, wherein said step (D) comprises the sub-steps of:
- (D-1) embedding the content of the confidential data in specific data to prepare faked confidential data as fake specific data; and
- (D-3) sending the faked confidential data to the server device via the communication line.

8. A character data display method in accordance with claim 3, wherein said step (D) comprises the sub-steps of:
- (D-4) receiving from the server device faked confidential data, which includes the content of the confidential data embedded in specific data; and
- (D-5) extracting the embedded content of the confidential data from the received faked confidential data.

9. A character data display method in accordance with claim 3, wherein said step (D) comprises the sub-step of:
- (D-6) in response to detection of a preset operation of the operation unit during display of the confidential data or the content of the selected confidential data, immediately hiding the displayed confidential data or the displayed content of the selected confidential data.

10. A character data display method in accordance with claim 3, wherein said step (D) comprises the sub-steps of:
- (D-7) storing the confidential data read from the server device;
- (D-8) counting number of times of displaying the content of each of the confidential data on the display screen; and
- (D-9) deleting specific confidential data, which has been displayed a predetermined allowable number of times, from the storage of the confidential data.

11. A character data display method in accordance with claim 3, wherein said step (D) comprises the sub-steps of:
- (D-7) storing the confidential data read from the server device;
- (D-10) making access to the server device under a predetermined condition to identify requirement or non-requirement for deletion of each of the stored confidential data; and
- (D-11) upon identification of the requirement for deletion of specific confidential data, deleting the specific confidential data from the storage of the confidential data.

12. A program that causes a computer to actualize a character data display method of reading character data including at least a character string from a server device on a communication line and displaying the character data, said program causing the computer to attain the functions of:
- (A) displaying an option menu, which includes multiple options corresponding to multiple functions in a selectable manner;
- (B) detecting an operation of an operation unit that is provided for selecting one of the multiple options included in the option menu to activate a corresponding one of the multiple functions;
- (C) enabling a first function that is activated by selection of a corresponding option in the option menu, to display non-confidential character data as general data in a selectable manner and, in response to selection of one of the displayed general data, to display content of the selected general data;
- (D) enabling a second function that is not included as one option in the option menu but is activated by a specific series of operations of the operation unit in a preset order, to display confidential character data as confidential data in a selectable manner and, in response to selection of one of the displayed confidential data, to display content of the selected confidential data,
- wherein said function (B) detects the specific series of operations of the operation unit in the preset order without displaying an operation-related window.

13. A program in accordance with claim 12, wherein said function (A) displays the option menu that includes a selectable option corresponding to a third function, in addition to the option corresponding to the first function, and
- said function (D) enables the second function in response to the specific series of operations of the operation unit in the preset order during execution of the third function.

* * * * *